(12) United States Patent
Jackson et al.

(10) Patent No.: US 12,325,662 B2
(45) Date of Patent: Jun. 10, 2025

(54) SYSTEMS AND METHODS FOR SELF-SUSTAINING REACTIVE CEMENTITIOUS SYSTEMS

(71) Applicants: Marie D. Jackson, Salt Lake City, UT (US); Philip F. Brune, Parkland, FL (US)

(72) Inventors: Marie D. Jackson, Salt Lake City, UT (US); Philip F. Brune, Parkland, FL (US)

( * ) Notice: Subject to any disclaimer, the term of this patent is extended or adjusted under 35 U.S.C. 154(b) by 661 days.

(21) Appl. No.: 17/483,553

(22) Filed: Sep. 23, 2021

(65) Prior Publication Data

US 2022/0089486 A1 Mar. 24, 2022

Related U.S. Application Data

(60) Provisional application No. 63/082,448, filed on Sep. 23, 2020, provisional application No. 63/082,444, filed on Sep. 23, 2020.

(51) Int. Cl.
| | | |
|---|---|---|
| *C04B 14/24* | (2006.01) | |
| *C04B 7/12* | (2006.01) | |
| *C04B 14/16* | (2006.01) | |
| *C04B 22/00* | (2006.01) | |
| *C04B 22/06* | (2006.01) | |
| *C04B 103/10* | (2006.01) | |

(52) U.S. Cl.
CPC ............... *C04B 14/24* (2013.01); *C04B 7/12* (2013.01); *C04B 14/16* (2013.01); *C04B 22/0093* (2013.01); *C04B 22/064* (2013.01); *C04B 2103/10* (2013.01)

(58) Field of Classification Search
CPC ........... C04B 14/24; C04B 7/12; C04B 14/16; C04B 22/0093; C04B 22/064; C04B 28/18; C04B 2103/10; Y02W 30/91
See application file for complete search history.

(56) References Cited

U.S. PATENT DOCUMENTS

| 11,905,212 B1 | 2/2024 | Smeltz |
| 2011/0203489 A1 | 8/2011 | Constantz et al. |
| 2022/0089476 A1 | 3/2022 | Hust et al. |

FOREIGN PATENT DOCUMENTS

| CN | 101941755 B | * 11/2011 |
| CN | 111620620 A | 5/2020 |

OTHER PUBLICATIONS

Jackson, M. D., D. Deocampo, F. Marra, and B. E. Scheetz, 2010, Mid-Pleistocene Pozzolanic Volcanic Ash in Ancient Roman Concretes: Geoarchaeology, vol. 25, No. 1, 36-74.
Jackson, M., B. Scheetz, F. Marra, 2010, Micromorphological textures and pozzolanic cements in Imperial Age Roman Mortars: In Proceedings of the Second Historic Mortars Conference (HMC 2010) and RILEM TC 203-RHM Final Workshop, Prague, edited by J. Valek, C. Groot, and J. Hughes, Sep. 22-24, 2010.
Jackson, M., G. Vola, J. P. Oleson, B. Scheetz, C. Brandon, R. Hohlfelder, 2012, Cement Compositions and Durability in Ancient Roman Seawater Concretes: Historic Mortars, Characteristics and Tests, edited by J. Valek, C. Groot, and J. Hughes. Springer—RILEM, p. 49-76.
Jackson, M. D., J. Moon, E. Gotti, R. Taylor, S. R. Chae, M. Kunz, A.-H. Emwas, C. Meral, P. Guttmann, P. Levitz, H.-R. Wenk, P. J. M. Monteiro, 2013, Unlocking the secrets of Al-tobermorite in Roman Seawater Concrete: Journal of the American Mineralogist, vol. 98, pp. 1669-1687.
Jackson, M. D., 2014, Sea-Water Concrete Fabrics and their Material Characteristics: In Building for Eternity the History and Technology of Roman Concrete Engineering in the Sea, edited by J. P. Oleson, Oxbow Books, Oxford, 141-187.
Jackson, M. D., E. N. Landis, P. F. Brune, M. Vitti, H. Chen, Q. Li, M. Kunz, H.-R. Wenk, P. J. M. Monteiro, A. R. Ingraffea, 2014, Mechanical resilience and cementitious processes in Imperial Roman architectural mortar: Proceedings of the National Academy of Sciences, 111[52], 18484-18489. doi:www.pnas.org/cgi/doi/10.1073/pnas.1417456111.
Jackson, M. D., S. R. Mulcahy, H. Chen, Y. Li, Q. Li, P. Cappelletti, H.-R. Wenk, 2017, Phillipsite and Al-tobermorite mineral cements produced through low-temperature water-rock reactions in Roman marine concrete: American Mineralogist, vol. 102, pp. 1435-1450.
Jackson et al.; Geoarchaeology: An International Journal, vol. 25, No. 1, pp. 57, 62, and 69.
International Search Report and Written Opinion for PCT International Application No. PCT/US21/51827, Jan. 26, 2022.
Brune et al., The fracture toughness of an Imperial Roman mortar, Engineering Fracture Mechanics 102, 2013, 65-76 (13 PP.).
Brune et al.,Roman Concrete Vaulting in the Great Hall of Trajan's Markets: Structural Evaluation, Journal Of Architectural Engineering, 332-340, Dec. 2012 (9 PP.).
Brune, The Mechanics of Imperial Roman Concrete and the Structural Design of Vaulted Monuments, Department of Mechanical Engineering Arts, Sciences and Engineering Edmund A. Hajim School of Engineering and Applied Sciences, 2010, University of Rochester, NY (456 PP.).

(Continued)

*Primary Examiner* — Anthony J Green
(74) *Attorney, Agent, or Firm* — Bryant J. Keller; Kirton McConkie

(57) ABSTRACT

The described systems, methods, and compositions relate to systems, methods, and compositions for forming one or more cementitious materials that cure into one or more mortars or concretes. More particularly, some embodiments relate to systems, methods, and compositions for producing cured cementitious materials that tend to increase in strength over time due to the use of one or more reactive aggregates that interact with one or more activating materials (lime components). In some cases, a mortar or a concrete includes a reactive aggregate with an oven-dried bulk density between about 0.25 and 3.0 gm/cc and a porous structure, wherein at least 5% of a total mass of the reactive aggregate is comprised of particles less than (or equal to) 1 mm. In some such embodiments, the cementitious mixture further comprises a hydrating solution including water and an activating material, wherein the activator comprises at least 40% calcium oxide, by mass.

20 Claims, 6 Drawing Sheets

(56) References Cited

OTHER PUBLICATIONS

Brune et al., The toughness of imperial roman concrete, Fracture Mechanics of Concrete and Concrete Structures, Recent Advances in Fracture Mechanics of Concrete—B. H. Oh, et al.(eds), Korea Concrete Institute, Seoul, May 23-28, 2010, (9 PP.).

Brune et al., Innovative Experimentation on Ancient Material: Exploring the Fracture of Imperial Roman Concrete, 2010 Structures Congress, May 2010, 1938-1948 (12 PP.).

Brune et al.,Concrete vaulting in Imperial Rome: A structural analysis of the Great Hall of Trajan's Markets, 6th International Conference on Computation of Shell and Spatial Structures IASS-IACM, May 28-31, 2008 (5 PP.).

Ma el al., Mechanical properties of coral concrete subjected to uniaxial dynamic compression, Construction and Building Materials, vol. 199, Feb. 28, 2019, 244-255.

International Search Report and Written Opinion for PCT International Application No. PCT/US21/51833, Mar. 28, 2023.

Maraghechi, H., "Development and Assessment of Alkali Activated Recycled Glass-Based Concretes for Civil Infrastructure," A Dissertation in Civil and Environmental, The Pennsylvania State University, 2014.

* cited by examiner

SYSTEMS AND METHODS FOR SELF-SUSTAINING REACTIVE CEMENTITIOUS SYSTEMS

RELATED APPLICATIONS

This claims priority to U.S. Provisional Patent Application Ser. No. 63/082,444, filed Sep. 23, 2020, and entitled "METHOD FOR SELF-SUSTAINING REACTIVE CEMENTITIOUS SYSTEMS", as well as to U.S. Provisional Patent Application Ser. No. 63/082,448, filed Sep. 23, 2020, and entitled "METHOD FOR PRODUCING SELF-SUSTAINING SALTWATER REACTIVE CEMENTITIOUS SYSTEMS"; the entire disclosures of which are incorporated herein by reference.

FIELD

The described systems and methods relate to systems and methods for forming one or more mortars or concretes.

BACKGROUND

Many types of building materials exist for constructing buildings, homes, roads, dams, bridges, tunnels, sidewalks, storage of waste materials, and other human-made structures. Building materials can serve many purposes from structural to aesthetic. In this regard, a building material is often selected based on its physical and material properties, ranging from its compressive and its tensile strength, to its resistance to fracture and to chemical deterioration, to its expense, to its durability, to its versatility in diverse structural applications, and to its aesthetics.

Concrete has been used for many centuries as a building material. A few benefits of concrete are its cost, versatility, and durability. In this regard, concrete can be molded into various shapes, from stormwater pipes to large hydroelectric dams, like the Hoover Dam. Although concrete structures can be prefabricated and transported, in some cases, concrete structures can be installed on-site-thus reducing transportation costs.

While concrete can have many advantageous characteristics, cement-based concrete is not necessarily without its disadvantages. For instance, some types of cement-based concrete have a tendency to crack, break, scale, crumble, and otherwise weaken or deteriorate over time. As a result, many cement-based concrete structures need to be repaired and/or replaced when they are used for extended periods of time. Additionally, cement-based concretes often have a relatively low tensile strength. Accordingly, cement-based concrete is often reinforced with steel rebar to meet performance specifications. Many cement-based concretes are also susceptible to chemical degradation through interactions with fluids that produce, for example, expansive gels associated with alkali silica reaction, magnesium and sulfate attack, and corrosion of steel reinforcement. Moreover, the creation and use of some cement-based concretes can have significant environmental consequences, such as producing relatively large amounts of greenhouse gas emissions in the production of cement and the consumption of significant amounts of freshwater in preparation of the concrete (and/or the rebar reinforcement within the concrete).

Thus, while cement-based concrete is used as a building material that is often praised for its relatively low cost and adaptability, some challenges still exist, including those listed above. Accordingly, it would be an improvement in the art to augment or even replace current techniques and materials with other techniques and materials.

SUMMARY

The described systems, methods, and compositions relate to systems, methods, and compositions for forming one or more cementitious mixtures that cure to form mortar and/or concrete. More particularly, some implementations relate to systems, methods, and compositions for forming mortars and/or concretes that are configured to: maintain their strength over extended periods of time, be resistant to the formation of structural-scale discontinuities, increase in strength as time progresses, reduce the environmental consequences associated with their manufacture and installation, and/or (in some cases) have an ability to form new cementitious phases over the lifetime of the mortar or concrete (e.g., to create regenerative post-pozzolanic processes that occur over time, to bond fractured surfaces, to add cohesion to interfacial zones, to refine pore space, to remodel the binding phases and a cementing matrix, to deter the coalescence of microcrack networks, to have regenerative self-repair properties at the micrometer to centimeter scale, and/or to otherwise provide the mortars and/or concretes with one or more self-sustaining and/or regenerative properties). A post-pozzolanic material, in some cases, continues to beneficially react within the mortar or concrete system after the pozzolanic activator (e.g., calcium hydroxide) has been consumed. A pozzolan, in some cases, is a material that may react with lime in the presence of moisture and may form durable binding hydrates. Accordingly, in some implementations, the described cured mortars and/or concretes can have a lifespan that is significantly longer (e.g., in some cases, orders of magnitude longer) than that of some competing materials (i.e., some competing Portland cement concretes). In this regard, one or more of the aforementioned characteristics are due (in some cases) to the use of one or more aggregates (e.g., reactive aggregates) that interact with one or more hydrating solutions, activating materials (e.g., lime components), filler aggregates (e.g., reactive filler aggregates), and/or any other suitable material.

The described cementitious mixtures (the wet mixtures before curing) and their resultant cured mortars and/or concretes can comprise any suitable types of aggregates, including, without limitation, one or more non-reactive (or inert) aggregates, such as rocks, minerals, quartz sand, limestone sand, shells, crushed rock, non-pozzolanic materials, and/or any other suitable inert aggregate in silt-sized, sand-sized, gravel-sized, and cobble-sized fractions. In some cases, however, the described cementitious mixtures and their resultant mortars and/or concretes include one or more reactive aggregates (e.g., one or more types of engineered cellular magmatic material, foam glass product, slag, natural volcanic pumice, synthetic pumice, ceramic material, brick fragments, fired brick fragments, volcanic tephra, volcanic scoria, volcanic tuff, lava, volcanic glass, natural volcanic rock particles, pyroclastic deposit material, vitric volcanic fragments, lithic volcanic fragments, crystalline volcanic fragments, fine ash fragments, coarse ash fragments, lapilli fragments, bomb fragments, zeolites, carbonate rock, material mined from a geologic deposit, and/or any other suitable pozzolanic or reactive material or materials that are configured to produce cementitious phases when reacted with lime and/or hydrated lime).

In some implementations, inert aggregates may be included in a cementitious mixture for economic reasons, such as extending the volume of the reactive material, availability of inert aggregates, increased mechanical stiffness and strength, and improved fracture properties.

Additionally, in some implementations in which the reactive aggregate comprises one or more pozzolanically or post-pozzolanically reactive materials, the reactive aggregate comprises one or more types of reactive volcanic tephra aggregate. In this regard, while such tephra aggregate can come from any suitable location (e.g., the site of any suitable volcanic activity), in some non-limiting cases, such tephra is obtained from one or more volcanic deposits in Italy (e.g., central Italy). However, as tephra from specific volcanoes in Italy may be limited in supply or relatively hard to come by, in some implementations, engineered cellular magmatic aggregates and/or other human-made reactive aggregates can provide similar characteristics (having chemical, mineralogical, and/or physical properties that are comparable to that of volcanic deposits, including, without limitation, those in central Italy), while resolving the geological, geographical, scarcity, and/or logistical issues that can be associated with the use of Italian (and/or other) tephras.

In some implementations, the reactive aggregate comprises one or more pozzolanic materials that are configured to react with hydrated lime and/or lime hydroxide to form a strengthening or enhancing compound in a cementitious mixture and in the mixture's resultant mortar or concrete. In some implementations, an inert or non-reactive aggregate comprises one or more materials that have little or no interactions with an activating material, or interstitial fluids. Additionally, reactive aggregates may include aggregates that chemically react with the activating material (e.g., the hydrated lime) to form cementitious phases. In this regard, where the aggregate comprises one or more reactive aggregates (as opposed to solely or predominantly comprising inert aggregates, such as conventional or inert quartz sand and/or crushed rock), after the initial amount of the activating material (e.g., the hydrated lime) is consumed in initial pozzolanic reactions, additional cementitious phases are produced (in some implementations) through regenerative post-pozzolanic processes involving the reactive aggregate (and/or reactive filler aggregate, as discussed below) over the lifetime of the material.

In some such implementations, the reactive aggregate comprises one or more synthetic reactive aggregates, such as engineered cellular magmatic (or proxies for bubble-rich magmas), synthetic tephra materials, synthetic pumice, foam glass product, and/or porous ceramic materials. Indeed, in some implementations, the reactive cellular magmatic aggregate comprises: $SiO_2$ at any suitable concentration in the bulk composition of the reactive aggregate, including, without limitation, at a concentration of between about 40 wt % and 75 wt % (or within any subrange thereof); $Al_2O_3$ at any suitable concentration, including, without limitation, at a concentration between about 3 wt % and about 20 wt % (or within any subrange thereof); $Na_2O+K_2O$ at any suitable concentration, including, without limitation, at a concentration between about 3 wt % and about 20 wt % (or within any subrange thereof); and/or any other suitable component (at any suitable concentration). In accordance with some embodiments, the engineered cellular magmatic aggregate contains both amorphous glass and crystalline phases, such that one or the other or both are configured to be reactive when in contact with a gas or fluid. In some embodiments, the engineered cellular magmatic aggregate contains cellular bodies, a vesicular porosity, and/or a fine granular fraction that has amplified surface area from broken cells and vesicles.

Where the described cementitious mixture and its resultant mortars and/or concretes comprise one or more reactive aggregates, the reactive aggregate includes one or more chemical and/or physical properties that allow the reactive aggregate to react with the activator (or activator, lime activator, or lime component) to increase an overall mortar or concrete stiffness and cohesion once the cementitious mixture cures and hardens. As an example of a suitable characteristic, the reactive aggregate can have any suitable density that allows it to be used to form the described cementitious mixtures and their resultant mortars and/or concretes. Indeed, in some implementations, the reactive aggregate (e.g., before being incorporated to form the cementitious mixture) has an oven-dried bulk density that is between about 0.1 gram per cubic centimeter (gm/cc) and about 3.5 gm/cc (or within any subrange thereof). Indeed, in some implementations in which the reactive aggregate includes natural volcanic rock (including, without limitation, tephra, pumice, scoria, tuff, and/or lava), the reactive aggregate comprises an oven-dried bulk density of between about 0.5 gm/cc and about 3.0 gm/cc (or within any subrange thereof). Moreover, in some other implementations in which the reactive aggregate includes one or more synthetic reactive aggregates (including, without limitation, engineered cellular magmatics, proxies for bubble-rich magmas (such as synthetic tephra materials), synthetic pumice, foam glass products, and/or porous ceramic materials), the aggregate comprises an oven-dried bulk density between about 0.25 gm/cc and about 2.75 gm/cc (or within any subrange thereof).

The described aggregate (i.e., the reactive aggregate) can have any suitable porosity that allows it to be used with the described systems, methods, and compositions to form mortar and/or concrete. Indeed, in some cases, the various particles of the reactive aggregate have a connected porosity, open cell configuration, and/or closed cell configuration that is between about 5% and about 50% by volume (or within any subrange thereof). Thus, in some implementations, the reactive aggregate is capable of absorbing an amount of water (and/or any other suitable hydrating solution) that is between about 5% and about 50% of the aggregate's volume (or within any subrange thereof).

The reactive aggregate can also be any suitable size. Indeed, in some implementations, any suitable portion of the reactive aggregate has a size (e.g., a sieve size) that is equal to and/or less than about 1 millimeter (mm). Indeed, in some implementations, at least 5% of a total mass of the reactive aggregate is comprised of particles less than 1 mm in size (e.g., diameter). In this regard, while any suitable amount of the reactive aggregate can be less than 1 mm in sieve size, in some implementations, between about 5% and about 100% (or any subrange thereof) of the reactive aggregate is less than 1 mm in size. Indeed, in some implementations, between about 10% and about 60% percent of the aggregate is smaller than 1 mm in size.

In some implementations, the amount of the reactive aggregate that is larger than 1 mm in size can be any suitable size that allows the described cementitious material and its resultant mortars and/or concretes (where one or more filler aggregates are added) to function as intended, including, without limitation, being between about 1 mm and about 32 mm in size (e.g., sieve size), or within any subrange thereof. Indeed, in some implementations in which the reactive aggregate is used in a cementitious mixture that is configured to form a mortar (i.e., a mixture that is substantially free from a filler aggregate that is added to the mixture to create a concrete), the reactive aggregate is, on average, less than about 5 mm in size (e.g., passing #4 sieve size).

With respect to the hydrating solution, the hydrating solution can comprise any suitable aqueous solution or solutions that are configured to hydrate the activating material (e.g., lime) and/or to mix with the reactive aggregate, the activating material, and/or any filler aggregate to form the described cementitious mixtures and their resultant mortars and concretes. Indeed, in some implementations, the hydrating solution comprises water (e.g., freshwater; potable water; deionized water; distilled water; filtered water; reverse osmosis water; wastewater; water from a river, lake, pond, or other body of water; and/or any other suitable type of water).

In some implementations, the hydrating solution acts as a moisture conditioning (or conditioning) solution for the aggregate and/or reactive aggregate (including filler aggregate and/or reactive filler aggregate). In such implementations, the hydrating solution may be applied to the aggregate/reactive aggregate at any suitable time, including, without limitation, prior to mixing the aggregate/reactive aggregate with at least a portion of the activating material, thus pre-moisture conditioning the aggregate/reactive aggregate. In some cases, in which the hydrating solution is used to pre-moisture condition or pre-condition the aggregate/reactive aggregate, the hydrating solution may be referred to as a conditioning solution. Thus, in some implementations, the hydrating solution (or conditioning solution) acts to moisturize and/or pre-moisturize the aggregate. In other implementations, when the hydrating solution is used with the activating material, the hydrating solution may have a chemical reaction with the activating material that causes the activating material to hydrate. In some such implementations, the hydrating solution may be referred to as a hydrating fluid. In other implementations, the hydrating solution is used as a mixing solution that is used to change the workability (e.g., consistency, viscosity, thickness, flow, and/or other suitable characteristic) of the cementitious mixture.

Where the hydrating solution is used as a conditioning solution, the conditioning solution can comprise any suitable solution, including, without limitation, any of the hydrating solutions, having any of the characteristics, discussed herein. Indeed, in accordance with some implementations, the conditioning solution comprises water and/or any other solution that is suitable to moisturize the aggregate/reactive aggregate prior to it being combined with at least some of the activating material. In accordance with some implementations, the mixing solution comprises water and/or any other solution that is suitable to changing the workability (e.g., consistency, viscosity, thickness, flow, and/or other suitable characteristic) of the cementitious mixture.

With respect to the activating material (or the activator), the activating material can comprise any suitable material or combination of materials that are configured to react with the aggregate (e.g., the reactive aggregate) and/or the hydrating solution to cure into a mortar or concrete. In some implementations, the activator comprises a clinker (e.g., a mixture of calcium oxide with silicone dioxide, aluminum oxide, iron oxide, and/or a variety of other oxides). In some other implementations, however, the activating material comprises lime and is clinker free (or at least the dry form of the activating material comprises less than 10% clinker, by mass). In this regard, while the production of some clinker phases (used as the basis for some Portland cement concretes) requires temperatures of about 1450 degrees C., some implementations of the described systems, methods, and compositions can include lime produced from the calcination of limestone at about 900 degrees C. (thereby producing less $CO_2$ and wasting less fuel than some methods for creating Portland cement concrete). Additionally, as some implementations of the activating material in the described systems, methods, and compositions are clinker free, such systems, methods, and compositions do not necessarily require the energy-intensive grinding processes that can be used to fabricate and incorporate the various oxides needed to produce the clinker and to powder the clinker to form the cement component in some Portland cement concretes.

Where the activating material comprises lime, the activating material can comprise any suitable type of lime, including, without limitation, one or more types of lime, quicklime (e.g., calcium oxide (CaO) produced by calcining high purity carbonate rock (e.g., rock with about 92 wt % to about 95 wt % calcium oxide)), slaked lime powder (e.g., a form of calcium hydroxide that contains molecular water so as to be a dry powder), calcium hydroxide ($Ca(OH)_2$), hydrated lime, lime paste, lime slurry, and/or any suitable type of lime product and/or lime composition. In some cases, the activating material comprises quicklime with an initial calcium oxide content of 40% or greater. In this regard, while the activator can comprise any suitable amount of calcium oxide and/or calcium hydroxide, in some implementations, the activator includes at least 40 wt % (e.g., between about 40 wt % and about 100 wt %, or within any subrange thereof) calcium oxide and/or calcium hydroxide, when the activator is dry and/or comprises only molecular water. Indeed, in some implementations, the activator includes between about 50% and about 90% calcium oxide when it is dry and encompasses hydraulic lime, dolomitic lime, and/or magnesium lime. In some embodiments, the activating material is derived from a material that has been 40 wt % and 100 wt % calcium oxide, or within any subrange thereof (e.g., between about 45% and about 90%). In this regard, the activator (e.g. quicklime) may be combined with reactive aggregate, after hydration of the activator to a paste-like workability, including, without limitation, at a ratio of hydrated activator to reactive aggregate about 1:1.25 to about 1:5.5 by volume. In some cases, the ratio may be 1:3. In this regard, the activator (e.g. quicklime) may be combined with reactive aggregate, after hydration of the activator to a consistency where the activator forms lumps approximately 0.1 mm to 6 mm in diameter, or within any subrange thereof (e.g., 0.1 cm-2 cm in diameter), including, without limitation, at a ratio of hydrated activator to reactive aggregate about 1.25:1 to about 1:5.5 by volume (or within any subrange thereof). In some cases, the ratio may be about 1:3. In some cases, the concentration of calcium oxide in the un-hydrated activator is between about 88 wt % and about 99 wt %, or within any subrange thereof (e.g., about 92 wt % to about 98 wt %) calcium oxide. In some cases, the maximum and minimum ratio between the aggregate and the activating material may range from 10:1 to 1:1 by volume when used to form a cementitious mixture, but may include any suitable range. In some cases, such concentration is between about 2.5:1 and about 3.5:1 by volume. The activating material may be comprised of any form of lime material that is derived from, made from, and/or that may be made into lime with a calcium oxide content of 40 wt % or greater. In this regard, the activator can be mixed with any suitable amount of reactive aggregate in the described cementitious mixture, including, without limitation, a ratio between the activating material, when dry or when hydrated, and the reactive aggregate, when dry or when hydrated, of between 0.01 to 10, by mass.

While the described cementitious mixtures can comprise relatively small particles of aggregate (e.g., reactive aggregates that are smaller than about 5 mm in size and/or that are any other suitable size) to form a mortar, in some implementations, one or more filler aggregates are added (at any suitable time and in any suitable amount) to the cementitious mixture to form concrete. In this regard, the filler aggregate (or one or more aggregates that are larger, generally speaking, than the reactive aggregate used to form mortar) can perform any suitable function, including, without limitation, increasing the volume of the cementitious mixture, providing additional strength to the cementitious mixture when it cures as a concrete, generating a self-reinforcing conglomeratic framework for the concrete, increasing the fracture toughness of the resultant concrete, changing the aesthetics of the cementitious mixture and its resultant concrete, lowering the economic and environmental costs of producing and installing the cementitious mixture and its resultant concrete, and/or performing any other suitable function.

Where one or more filler aggregates are added to the cementitious mixture (e.g., the mixture of one or more reactive aggregates, activating materials, hydrating solutions, and/or any other suitable material), any suitable filler aggregate can be added to the cementitious mixture, including, without limitation, one or more types of non-reactive and/or reactive aggregates. Indeed, any suitable reactive aggregate or non-reactive aggregate (including aggregates or combination of each of the aggregates listed above) can be used as the filler aggregate. In some cases, the filler aggregate comprises engineered cellular magmatic material, slag, ceramic fragments, brick fragments, fired brick fragments, crushed recycled Portland cement concrete, natural volcanic pumice, synthetic pumice, volcanic tephra, volcanic scoria, volcanic tuff, lava, natural volcanic rock particles, pyroclastic deposit material, carbonate rock, and/or material mined from a geologic deposit. In some cases, the preferred filler aggregates may be volcanic tuff, lava, carbonate rock, and/or ceramic or brick fragments.

While the filler aggregate can have any characteristic of the aggregate that is used to create mortars (e.g., porosity, chemical composition, density, water absorption, and/or any other characteristic, as mentioned above), in some implementations, the filler aggregate that is used to create concretes may have any suitable particle size that is larger, on average, than the aggregate (e.g., the reactive aggregate) that is used to form mortars. Indeed, in some implementations, the filler aggregate has a particle size that is larger than 0.5 mm (e.g., between about 0.5 mm and about 32 cm, or within any subrange thereof). In other implementations, however, the filler aggregate has an average particle size that is larger than 2 mm (e.g., between about 2 mm and about 15 cm).

Additionally, while the filler aggregate can be added to the cementitious mixture at any suitable ratio, in some implementations, the filler aggregate is added to the cementitious mixture of one or more reactive aggregates, activating materials, and/or the hydrating solutions at a ratio that is equal to or less than about 6 parts filler aggregate per 1.5 parts cementitious mixture by volume. Thus, in some implementations, the filler aggregate comprises about 80% or less of a total volume of the resultant concrete. Indeed, in some implementations, the described concrete (e.g., cured cementitious mixture comprising filler aggregate) comprises between about 25% and about 75% of the total volume of the cementitious mixture.

The described cementitious materials and their resultant mortars and concretes can be made in any suitable manner. In one method, the aggregate (e.g., the reactive aggregate) is optionally conditioned (e.g., with the conditioning solution). While such a conditioning can take place in any suitable manner, in some cases, the reactive aggregate is placed in a container (e.g., a sealable container, an open container, a partially sealable container, a mixer, a vacuum container, and/or any other suitable container) and a suitable amount of the hydrating solution is added to the reactive aggregate. In some embodiments, the amount of the hydrating solution may be generally equal to or less than the measured water absorption of the reactive aggregate. In this regard, any suitable amount of hydrating solution can be added to the aggregate. Indeed, in some implementations, a mass of water (and/or any other suitable hydrating solution) to reactive aggregate (and/or any other suitable aggregate material) is at a ratio of between about 0.1:1 and about 5:1, or within any subrange thereof (e.g., 1.25:1 to 3.5:1). More specifically, in some implementations, between about 0.1 parts and about 5 parts hydrating solution (by mass) are added to 1 part aggregate (e.g., reactive aggregate). Indeed, in some embodiments there may be excess hydrating solution after the hydrating solution has been mixed with the reactive aggregate. While any suitable amount of the hydrating solution (e.g., as the conditioning fluid and/or as the mixing solution) can be added to the aggregate, in some implementations, an amount of the hydrating solution that is about twice the measured water absorption of the reactive aggregate (by mass) may be added to 1 part aggregate (e.g., reactive aggregate).

Where the hydrating solution is added to the aggregate (e.g., the reactive aggregate), any suitable hydrating solution can be added to the aggregate. Indeed, in some implementations, water (e.g., freshwater) is added to the aggregate.

In some cases, once the hydrating solution has been added to the aggregate (e.g., the reactive aggregate), the aggregate and hydrating solution are mixed in any suitable manner (e.g., via trowel, hoe, rotary mixer, machine mixing, rotating drum, pug mill, paddle mill and/or in any other suitable manner) to help distribute moisture throughout the mixture.

In some cases, the container is sealed and the mixture of aggregate (e.g., reactive aggregate and the hydrating solution) is allowed to rest for any suitable period of time (including, without limitation, between about 1 second (s) and about 180 days (d), or within any subrange thereof). Indeed, in some cases, the container is sealed and the mixture is allowed to rest for between about 4 h and about 2 d (e.g., between about 3.5 and about 48 h).

In some cases, the activating material that comprises lime is combined with water and/or any other suitable hydrating solution to hydrate the lime and to provide the activator with a paste or putty-like consistency. In this regard, any suitable amount of hydrating solution can be added to the activator material. Indeed, in some implementations, a ratio of the hydrating solution (e.g., water and/or any other suitable aqueous solution) to the activator (e.g., lime) is between about 0.25:1 and about 10:1 (as mentioned above) or within any subrange thereof (e.g., between about 1.25:1 and about 3.5:1 by mass).

In some cases, the conditioned aggregate (e.g., conditioned reactive aggregate) and the hydrated activating material are mixed together to form a cementitious mixture that can be used to form a mortar. In this regard, the conditioned aggregate and the hydrated activating material can be mixed together at any suitable ratio. Indeed, in some implementations, a ratio of the conditioned reactive aggregate and the activator (e.g., lime) and the hydrating solution (e.g., the hydrated lime) is between about 0.5:1 and about 10:1, or within any subrange thereof (e.g., 1.5:1 and about 5:1) by volume.

Despite the foregoing, in some cases, the aggregate (e.g., the reactive aggregate) is not conditioned. In some such cases, the aggregate (e.g., the reactive aggregate that has not been conditioned) is mixed with both water (and/or any other suitable hydrating solution) and the hydrated activating material until the activating material is properly dispersed to form a cementitious mixture. In this regard, the aggregate and the hydrated activating material can be mixed together at any suitable ratio. Indeed, in some implementations, a ratio of the reactive aggregate and the activator (e.g., lime) and the hydrating solution (e.g., the hydrated lime) is between about 0.5:1 and about 10:1 by volume, or within any subrange thereof (e.g., 1.5:1 and about 5:1) by volume.

In some cases in which the cementitious mixture is to be cured to form a mortar, little to no filler aggregate is added to the mixture. In some other cases, however, filler aggregate (e.g., one or more reactive filler aggregates) is added to the cementitious mixture to ultimately form concrete. In this regard, the filler aggregate can be added to the cementitious mixture in any suitable manner (e.g., manual placement, via rotary mixer, via a hopper, via a pug mill, via a paddle mill, and/or in any other suitable manner) and at any suitable time (e.g., with the reactive aggregate, before mixing, during mixing, during installation, and/or at any other suitable time). Indeed, in some implementations where the filler aggregate is smaller than about 32 mm, the filler aggregate is added directly into, and mixed with, the cementitious mixture. In some implementations in which the filler aggregate is larger than about 32 mm, the filler aggregate is added to the cementitious mixture in any other suitable manner, including, without limitation, manually, via a pug mill, via a paddle mill, via a conveyor, via a rotary mixer. Again, in some implementations, the filler aggregate (e.g., the reactive filler aggregate) does not exceed 80%, by volume, of the final cementitious mixture.

Once the cementitious mixture has been created, it can be dumped, carried, molded, pre-cast, cast, manually transported, conveyed, pumped, and/or otherwise be installed in any suitable location and allowed to cure.

In addition to the implementations described above, the described systems, methods, and compositions can be modified in any suitable matter. Indeed, in some implementations, the described cementitious mixture and its resultant mortar and/or concrete comprise one or more other materials, including, without limitation, one or more non-metallic reinforcements, glass fiber reinforcement, extruded basalt fibers, types of basaltic particles, glass derived from basalt, crystalline particles (such as zeolites), synthetic fibers (such as para-aramid), natural fibers (such as cellulose), natural plant fibers, and/or any other suitable material. Moreover, in some implementations, the various ingredients of the described mortars and concretes are combined according to different proportions to achieve a desired result. Additionally, in some cases, one or more portions of the described methods are omitted, repeated, modified, performed sequentially, performed simultaneously, performed so as to at least partially overlap each other, replaced, substituted with another portion, reordered, mixed with any other method described herein, and/or otherwise modified. Furthermore, while the described systems, methods, and compositions are discussed with respect to mortar and concrete, the skilled artisan will recognize that such systems, methods, and compositions can be used to form any other suitable material.

These and other features and advantages of the described systems, methods, and compositions will be set forth or will become more fully apparent in the description that follows and in the appended claims. The features and advantages may be realized and obtained by means of the instruments and combinations particularly pointed out in the appended claims. Furthermore, the features and advantages of the described systems, methods, and compositions may be learned by the practice thereof or will be obvious from the description and drawings, as set forth hereinafter.

BRIEF DESCRIPTION OF THE DRAWINGS

In order that the manner in which the above-recited and other features and advantages of the present systems, methods, and compositions are obtained, a more particular description of the described systems, methods, and compositions will be rendered by reference to specific embodiments thereof, which are illustrated in the appended drawings. Understanding that the drawings are not necessarily drawn to scale or in proper proportion, and that the drawings depict only typical embodiments of the described systems, methods, and compositions and are not, therefore, to be considered as being limiting in scope, the described systems, methods, and compositions will be described and explained with additional specificity and detail through the use of the accompanying drawings in which.

DETAILED DESCRIPTION

Figure 1:
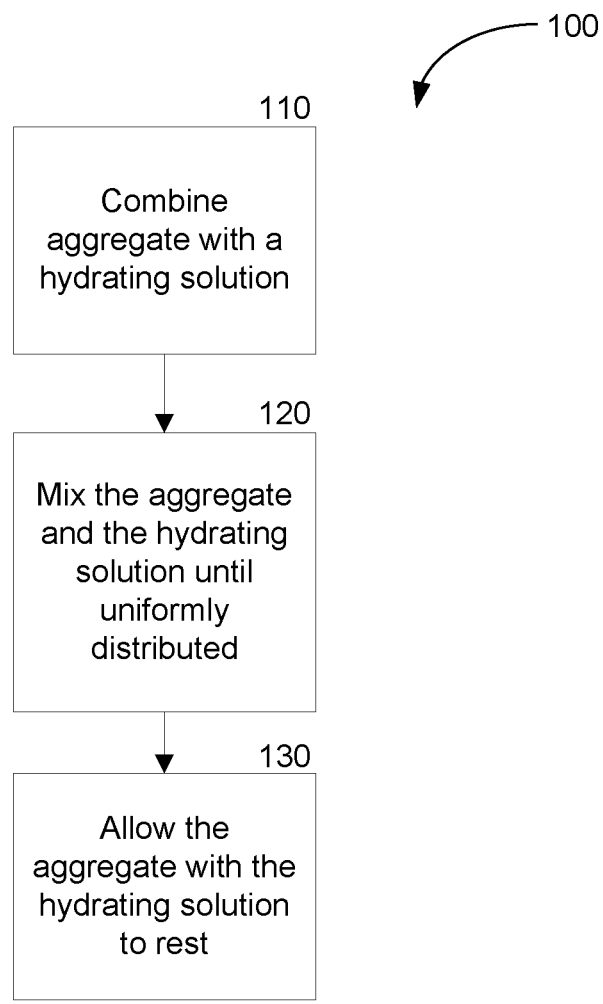
FIG. 1 illustrates a method for conditioning of an aggregate (e.g., reactive aggregate) in accordance with a representative embodiment.

The described systems, methods, and compositions relate to systems, methods, and compositions for forming one or more cementitious materials that cure into one or more mortars or concretes. More particularly, some embodiments relate to systems, methods, and compositions for producing cured cementitious materials that tend to increase in strength over time due to the use of one or more reactive aggregates that interact with one or more activating materials or activators (lime components). In some cases, a mortar or a concrete includes a reactive aggregate with an oven-dried bulk density between about 0.25 and 3.0 gm/cc and a porous structure, wherein at least 5% of a total mass of the reactive aggregate is comprised of particles less than (or equal to) 1 mm in size (e.g., diameter). In some such embodiments, the cementitious mixture further comprises (before being cured) a hydrating solution including water and an activating material (e.g., a lime activator), wherein the activator comprises at least 40% calcium oxide, by mass.

In accordance with some embodiments, the described systems, methods, and compositions produce one or more cured mortars and/or concretes with a long-term durability that is greater than the typical long-term durability of some Portland cement concretes. Durability of concrete may be defined as the ability of concrete to resist weathering action, chemical attack, micro- and macro-fracture, and/or abrasion while maintaining its desired engineering properties. While the described systems, methods, and compositions can comprise any suitable component or proceed in any suitable manner, in some embodiments, the described systems, methods, and compositions use one or more reactive aggregates to help obtain a cured mortar and/or concrete material that is configured to have an increased potential for long term durability.

As used herein, the term "cementitious mixture" (and variations thereof) may refer to a wet (or uncured) mixture comprising one or more aggregates (e.g., reactive aggregates), hydrating solutions (e.g., water and/or any other suitable hydrating solution), activator materials, filler aggregates, and/or any other suitable material or materials. In some cases, a cementitious mixture is in the form of a workable slurry or other mixture of solid and/or liquid components that hardens or cures to form a mortar (or a material that is free or substantially free from filler aggregate and/or that is used to form a coating material, a plaster, a render, a wall covering, and/or any other suitable material; to bind one or more materials together; and/or to perform any other suitable purpose) and/or a concrete (a mortar that comprises filler aggregate). While the aggregate in the cementitious mixture that is used to form a mortar can be any suitable size, in accordance with some embodiments, the aggregate in a mortar has particle sizes less than about 5 mm (e.g., between about 0.001 mm and about 5 mm, inclusive).

As used herein, the term concrete (and variations thereof) may refer to a cured cementitious mixture for a mortar that comprises one or more filler aggregates that are bonded together as the cementitious mixture hardens over time. While the filler aggregate can be any suitable size, in accordance with some embodiments, the filler aggregate in the cementitious mixture and its resultant concrete is typically larger in size than the aggregate (i.e., reactive aggregate) within the mortar. Each of the constituents of described cementitious mixtures and their resultant mortars and/or concretes will be described below, along with representative methods for preparing and mixing the ingredients to make cementitious mixtures, mortars, and/or concretes in accordance with some embodiments.

Aggregate

The described cementitious mixtures (the wet mixtures before curing) and their resultant mortars and/or concretes can comprise any suitable types of aggregates, including, without limitation, one or more non-reactive (or inert) aggregates, such as rocks, minerals, quartz sand, limestone sand, shells, crushed rock, non-pozzolanic materials, and/or any other suitable inert aggregate in silt-sized, sand-sized, gravel-sized, and/or cobble-sized fractions and/or any other suitable inert aggregate. In some cases, however, the described cementitious mixtures, mortars, and/or concretes include one or more reactive aggregates such as one or more types of engineered cellular magmatic material, foam glass product, ceramic material, brick fragments, fired brick fragments, natural volcanic pumice, synthetic pumice, volcanic tephra, volcanic scoria, volcanic tuff, lava, volcanic glass, natural volcanic rock particles, pyroclastic deposit material, vitric volcanic fragments, lithic volcanic fragments, crystalline volcanic fragments, fine ash fragments, coarse ash fragments, lapilli fragments, bomb fragments, zeolites, carbonate rock, material mined from a geologic deposit, and/or any other suitable pozzolanic or reactive material or materials that are configured to produce cementitious phases when reacted with hydrated lime. In this regard, one or more reactive and/or inert aggregates may be selected based on grain size and distribution, geologic origin, chemical and mineral makeup, shape (e.g. angular or rounded), crushed or non-crushed, natural or engineered strength, porosity, water absorption and/or any other suitable characteristic.

In some implementations, the reactive aggregate comprises one or more pozzolanic materials that are configured to react with hydrated lime to form a strengthening or enhancing compound in a cementitious mixture and in the mixture's resultant mortar or concrete. In some implementations, an inert or non-reactive aggregate comprises one or more materials that have little or no interactions with an activating material, or interstitial fluids. Additionally, reactive aggregates may include aggregates that chemically react with the activating material (e.g., the hydrated lime) to form one or more cementitious phases. In this regard, where the aggregate comprises one or more reactive aggregates (as opposed to solely or predominantly comprising inert aggregates, such as conventional or inert quartz sand or crushed rock), after the initial amount of the activating material (e.g., the hydrated lime) is consumed in initial pozzolanic reactions, additional cementitious phases are produced (in some implementations) through regenerative post-pozzolanic processes involving the reactive aggregate (and/or reactive filler aggregate, as discussed below) over the lifetime of the material.

The reactive aggregate can also be any suitable size. In accordance with some embodiments, the reactive aggregate and/or filler aggregate comprises a fine to coarse grained particulate material that can be used in construction, including sand, gravel, crushed stone, slag, and/or any other suitable aggregate that comprises a reactive material. In accordance with some embodiments, a mortar (and the activating material that is used to create the mortar) typically contains only fine-grained aggregates, such as those less than 5 mm in diameter. In accordance with some embodiments, a concrete comprises fine-grained and/or coarse-grained aggregates. Indeed, in some cases the particle size (e.g., of filler aggregate) in cementitious mixtures for concrete may range from 0.5 mm to greater than 32 centimeters (cm) in diameter, or within any subrange thereof. The distribution and size of the aggregate may be determined based on the purpose of the cementitious mixture, in particular the application of the cementitious mixture, the required mass density of the concrete and/or mortar, and/or the required strength of the concrete and/or mortar, among other considerations.

In some cases, fine aggregates comprise fine sands, and coarse aggregates comprise coarse sands, gravels, and cobbles. In some cases, the term fine sand may refer to a material passing a 0.475 mm (No. 40) sieve and retained on a 0.075 mm (No. 200) sieve. Moreover, the term coarse sand may refer to a material passing a 2.00 mm sieve (No. 10) and retained on a 0.475 mm (No. 40) sieve. Additionally, the term gravel may refer to material passing a 75 mm (3 inch) sieve and retained on a 0.475 mm (No. 40) sieve. Furthermore, the term cobbles may refer to a material between 64 mm and 256 mm (e.g., between about 2.5 and about 10.1 inches). In some cases, fine aggregates may also comprise silt- and/or clay-sized particles. In some cases, these terms refer to a material passing the 0.075 mm (No. 200) sieve. Each of the dimensions above describes the narrowest width of a particle, such that this narrow width would pass through the open grid of a sieve.

In accordance with some embodiments, a custom graded aggregate comprises a reactive aggregate that has a formulation and/or specific distribution of particles in various sizes ranging from the smallest particle to the largest particle within a defined range. In accordance with some embodiments, a well-graded mixture of aggregate comprises a reactive aggregate that has an even distribution of particles in each size ranging from the smallest particle to the largest particle within the defined range. In accordance with some embodiments, a gap-graded mixture of aggregate comprises a reactive aggregate that has particles of only particular sizes and does not include particles in between those particular sizes.

In some cases, only fine sand (in reference to particle size) is used in the composition of the described cementitious mixture that cures to form a mortar (i.e., a mixture that is substantially free from a filler aggregate that is added to the mixture to create a concrete). In other cases, a mixture of fine sand and coarse sand is used in the composition of the described cementitious mixture that is used to form a mortar. In some other cases, the aggregate in the described cementitious mixture that is used to form a mortar comprises a custom graded mixture of particle sizes, including particles with diameters less than 0.075 mm ranging up to about 5 mm (or within any subrange thereof). Indeed, in some embodiments in which the reactive aggregate is used in cementitious mixture that is configured to form a mortar, the reactive aggregate is less than about 5 mm in size.

In some cases, the reactive aggregate in a cementitious mixture that is used to form a mortar may be a custom graded mixture of particles with particle diameters ranging in size and typically less than 5 mm. Additionally, in some cases, at least 5% of the particles in the described aggregate and/or the filler aggregate that are used to form a mortar or a concrete are less than 1 mm is size. Indeed, in some embodiments, between about 5% and about 100% (or any subrange thereof) of the aggregate (and/or filler aggregate, if any) has a particle size less than 1 mm. In some other embodiments, however, between about 25% and about 75% of the total aggregate (e.g., the aggregate and any filler aggregate) is less than 1 mm in size.

While the described cementitious mixtures can comprise relatively small particles of aggregate (e.g., reactive aggregates that are smaller than about 5 mm in size and/or that are any other suitable size) to form a mortar, in some implementations, one or more filler aggregates are added (at any suitable time and in any suitable amount) to the cementitious mixture to form concrete. In this regard, the filler aggregate (or one or more aggregates that are larger, generally speaking, than the reactive aggregate used to form mortar) can perform any suitable function, including, without limitation, increasing the volume of the cementitious mixture, providing additional strength to the cementitious mixture when it cures as a concrete, generating a self-reinforcing conglomeratic framework for the concrete, increasing the fracture toughness of the resultant concrete, changing the aesthetics of the cementitious mixture and its resultant concrete, lowering the economic and environmental costs of producing and installing the cementitious mixture and its resultant concrete, and/or performing any other suitable function.

Where one or more filler aggregates are added to the cementitious mixture (e.g., the mixture of one or more reactive aggregates, activating materials, hydrating solutions, and/or any other suitable material), any suitable filler aggregate can be added to the cementitious mixture, including, without limitation, one or more types of non-reactive and/or reactive aggregates. Indeed, any suitable reactive aggregate or non-reactive aggregate (including any aggregates or combination of the aggregates listed above) can be used as the filler aggregate. In some cases, the filler aggregate comprises one or more reactive aggregates, including, without limitation, engineered cellular magmatic material, ceramic fragments, brick fragments, fired brick fragments, crushed recycled Portland cement concrete, natural volcanic pumice, synthetic pumice, volcanic tephra, volcanic scoria, volcanic tuff, lava, natural volcanic rock particles, pyroclastic deposit material, carbonate rock and/or material mined from a geologic deposit. In some cases, the filler aggregate comprises volcanic tuff, lava, carbonate rock, and/or brick fragments.

While the filler aggregate can have any characteristic of the aggregate that is used to create mortar (e.g., porosity, chemical composition, density, etc.), in some embodiments (as mentioned) the filler aggregate that is used to create concretes can have any suitable particle size that is larger, on average, than the aggregate (e.g., reactive aggregate) that is used to form mortars. Indeed, in some embodiments, the filler aggregate has a particle size that is smaller than 0.5 mm (e.g., between about 0.5 mm and about 300 mm, or within any subrange thereof). In other embodiments, however, the filler aggregate has a particle size that is larger than 2 mm (e.g., between about 2 mm and about 32 mm).

Additionally, while the filler aggregate can be added to the cementitious mixture at any suitable ratio, in some implementations, the filler aggregate is added to the cementitious mixture of one or more reactive aggregates, activating materials, and/or the hydrating solutions at a ratio that is equal to or less than about 6 parts filler aggregate per 1.5 parts cementitious mixture by volume. Thus, in some implementations, the filler aggregate comprises about 80% or less of a total volume of the resultant concrete. Indeed, in some implementations, the described concrete (e.g., cured cementitious mixture comprising filler aggregate) comprises filler aggregate at between about 25% and about 75% (or within any subrange thereof) of the total volume of the cementitious mixture and/or the resultant concrete.

The described aggregate (i.e., the reactive aggregate, the filler aggregate, and/or reactive filler aggregate) can have any suitable porosity that allows it to be used with the described systems, methods, and compositions to form mortar and/or concrete. Indeed, in some cases, the various particles of the reactive aggregate have a connected porosity, open cell configuration, and/or closed cell configuration that is between about 5% and about 50% by volume (or within any subrange thereof). Thus, in some implementations, the reactive aggregate is capable of absorbing an amount of water (and/or any other suitable hydrating solution) that is between about 5% and about 50% of the aggregate's volume (or within any subrange thereof).

The reactive aggregate and filler aggregate (e.g., reactive filler aggregate) can be obtained from any suitable source. Indeed, in accordance with some embodiments, aggregate may be mined (or otherwise obtained) from one or more geologic deposits that are igneous, hydrothermal, sedimentary, and/or metamorphic in origin. Additionally, in some cases, aggregate can be derived from crushing or grinding larger rocks. In some cases, naturally occurring, mined aggregate tends to have a more rounded shape, and crushed aggregate tends to have a more angular shape. Additionally, in some non-limiting embodiments, mined fine aggregate is used in the described cementitious mixture. In some cases, such fine aggregate is a byproduct of a rock crushing operation. In some cases, aggregate used in concrete may be mined aggregate, and in some cases the aggregate may be crushed, or a combination of mined and crushed aggregate. Some non-limiting examples of natural and human-made aggregates are described below that are, in accordance with some embodiments, configured to provide one or more characteristics that are beyond those achieved from typical concrete aggregates, for example increased strength over time. In accordance with some embodiments, these reactive aggregates continue to react with the activating material to produce additional cementitious phases after the initial curing. As a non-exclusive group, these aggregates may be referred to as reactive aggregates.

In some embodiments in which the reactive aggregate comprises one or more pozzolanically or post-pozzolanically reactive materials, the reactive aggregate comprises one or more types of reactive volcanic tephra aggregate. In this regard, while such tephra aggregate can come from any suitable location (e.g., the site of any suitable volcanic activity), in some non-limiting cases, such tephra is obtained from one or more volcanic deposits in Italy (e.g., central Italy). However, as tephra from specific volcanoes in Italy may be limited in supply or relatively hard to come by, in some implementations, engineered cellular magmatic aggregates and/or other human-made reactive aggregates can provide similar characteristics (having chemical, mineralogical, and/or physical properties that are comparable to that of volcanic deposits, including, without limitation, those in central Italy), while resolving the geological, geographical, scarcity, and/or logistical issues that can be associated with the use of Italian (or other) tephras.

In some implementations, the reactive aggregate comprises one or more pozzolanic materials that are configured to react with lime and/or lime hydroxide to form a strengthening or enhancing compound in a cementitious mixture and in the mixture's resultant mortar or concrete. In some implementations, an inert or non-reactive aggregate comprises one or more materials that have little or no interactions with an activating material and/or interstitial fluids. In contrast, reactive aggregates may include aggregates that chemically react with the activating material (e.g., the hydrated lime) to form cementitious phases. In this regard, where the aggregate comprises one or more reactive aggregates (as opposed to solely or predominantly comprising inert aggregates, such as conventional or inert quartz sand or crushed rock), after the initial amount of the activating material (e.g., the hydrated lime) is consumed in initial pozzolanic reactions, additional cementitious phases are produced (in some implementations) through regenerative post-pozzolanic processes involving the reactive aggregate (and/or reactive filler aggregate, as discussed below) over the lifetime of the material.

In some cases, the reactive aggregate comprises and/or is derived from tephra. In this regard, the term tephra may be used herein to refer to fine ash-sized (e.g., particles less than 1 mm) to bomb-sized (particles greater than 6.4 cm) vitric, crystal, and/or lithic fragments that are ejected through explosive pyroclastic volcanic eruptions. In some cases, reactive aggregate may be derived from rock that forms through consolidation of the tephra described above.

Where the described cementitious mixture and its resultant mortars and/or concretes comprise one or more reactive aggregates, the reactive aggregate includes one or more chemical and/or physical properties that allow the reactive aggregate to react with the activator (or lime activator or lime component) to increase an overall mortar or concrete stiffness and/or cohesion once the cementitious mixture hardens. As an example of a suitable characteristic, the reactive aggregate can have any suitable mass density that allows it to be used to form the described cementitious mixtures and their resultant mortars and/or concretes.

In some cases, the reactive aggregate may have an oven-dried bulk density between 0.1 gm/cc and 3.5 gm/cc inclusive (or within any subrange thereof). Indeed, in some cases the reactive aggregate may have an oven-dried bulk density between 0.5 and 3.0 gm/cc inclusive.

In some cases, the reactive aggregate may have a connected porosity between 2% and 65% inclusive (or within any subrange thereof). Indeed, in some cases, the reactive aggregate may have a connected porosity between 5% and 45% inclusive. In some cases, the reactive aggregate may be suited for water absorption between 2%-65% inclusive (or within any subrange thereof). Indeed, in some cases, the reactive aggregate may be suited for water absorption between 5%-45% inclusive.

The reactive aggregate may be derived, in some cases, from whole rock or from volcanic glass. Whole rock and volcanic glass chemistry can range from tephritic (greater than or equal to 40% by weight of $SiO_2$ and 5%-9% by weight of $Na_2O+K_2O$) to phonolitic (50%-60% by weight of $SiO_2$ and less than or equal to 16% by weight of $Na_2O+K_2O$) to more common basaltic, dacitic, and rhyolitic compositions. Indeed, in some cases, primary volcanic crystals and authigenic mineral compositions can show wide variations for these diverse whole rock compositions. Volcanic rocks may be calcined prior to incorporation in the mortar or concrete.

Another example of a reactive aggregate is natural volcanic glass, which is generally naturally occurring glass that is the amorphous product of rapidly cooling magma. In some cases, a natural volcanic rock may have an oven-dried bulk density greater than 0.4 gm/cc and less than 3.0 gm/cc, or within any subrange thereof (e.g., 0.5 gm/cc and 2.8 gm/cc).

Another example of a reactive aggregate is natural pumice or pumicite in its powdered and/or dust form. In this regard, pumice is often a volcanic rock that generally comprises (or consists of) highly vesicular volcanic glass, which may or may not contain primary volcanic crystals and/or authigenic minerals. In some cases, a natural volcanic rock, such as pumice, may have an oven-dried bulk density greater than 0.4 gm/cc and less than 3.0 gm/cc or within any subrange thereof (e.g., 0.5 gm/cc and 2.8 gm/cc).

Reactive aggregates may be obtained from a geologic deposit as described above or they may be human-made, engineered products. Some non-limiting types of human-made aggregate include engineered cellular magmatic (or proxies for bubble-rich magmas), foam glass products, slag, synthetic pumice, ceramic material, brick fragments, and/or (among others) fired brick fragments. In accordance with some embodiments, engineered cellular magmatics (ECM) generally comprise synthetic stone materials that comprise glass, crystals and/or ceramic materials. In some cases, ECMs replicate rare, naturally occurring volcanic materials, and exhibit useful structural and chemical properties of those materials. In some such embodiments, ECMs function as reactive aggregate.

In some cases, slag comprises a glass-like by-product that is left over after a metal has been smelted from ore. Crushed masonry/ceramics are generally crushed bricks and other inorganic non-metallic materials that have been hardened by firing (e.g., brick fragments). Glass products may be derived from recycled glass or original glass and may be processed to become fine-grained aggregates. Several human-made reactive aggregates that are suitable for use in the cementitious mixture are described below.

In accordance with some embodiments, ECM can be any reactive type of synthetic stone that is suitable for use in a cementitious mixture. An ECM may be engineered to include a broad range of silicate species, with various reactivity. An ECM's physical structure can range from closed to open cell (being porous and/or connected porous), resembling pumice and/or porous ceramic. An ECM can be composed of internal pore and vesicular structures with individual cross sections that can be any suitable size (e.g., measuring from a millimeter or more on the upper end, down to a nanometer or less on the lower end). In some cases, open cell varieties of ECMs may exhibit extensive surface areas which can amplify ion exchange capabilities. In some cases, at least 5% of the particles in the ECM (and/or other reactive aggregates and/or reactive filler aggregate) are less than 1 mm in size. Indeed, in some embodiments, between about 5% and about 100% (or any subrange thereof) of the ECM has a particle size less than 1 mm. Additionally, in accordance with some embodiments, ECM aggregates have an oven-dried bulk density between about 0.25 and about 2.75 gm/cc (or within any subrange thereof).

In some cases, a foam glass comprises a porous glass foam material and can comprise any porous glass material, including, without limitation, crystalline phases, that is suitable for the cementitious mixture. In some cases, foam glass may be derived from glass (e.g., recycled glass and/or any other suitable glass source). In some cases, foam glass is subjected to a process to convert it into open-cell and/or porous foam glass. In some cases, the foam glass is created by heating a mixture of crushed glass and a foaming agent, wherein once the glass is close to being molten, the foaming agent releases a gas, which creates internal structure. An open-cell glass may have an internally connected pore structure that creates connected surface areas that aid absorption processes and/or other forms of transport.

In accordance with some embodiments, synthetic pumice is a human-made substitute for pumice stone and includes any type of synthetic pumice that is suitable for use in the described cementitious mixtures. In this regard, synthetic pumice can comprise any suitable material, including, without limitation, polyurethane foam, calcium stearate, calcium carbonate, and/or any other suitable pumice-like material.

In accordance with some embodiments, engineered aggregates, such as ECM, foam glass, and/or synthetic pumice have a cellular structure that is surrounded by glass (and/or any other suitable material) that is a metastable material. In some cases, the glass and/or its constituent crystals, which are produced during a foaming process, have the potential to react with the calcium hydroxide and/or hydrated lime in a cementitious mixture. In this regard, some of the described engineered aggregates mimic the melting process within the earth that fully or partially melt rocks and minerals to produce silicate fluids in the crust and upper mantle, called magma. According to some embodiments, the glass is not fully melted, but flows like magma and takes on the vesicular (pore) structure of magma when it erupts through the expansion of hot gases. The glass is then cooled in a manner to preserve the quasi-melted vesicular structure which is open. In some cases, however, the ECM or the foam glass has a closed vesicular structure.

In some cases, a ceramic particle comprises a particle of a ceramic and includes any type of ceramic particle that is suitable for the cementitious mixture. A ceramic can be any of the various hard, brittle, heat-resistant, and/or corrosion-resistant materials made by shaping and then firing a suitable inorganic, nonmetallic material, such as clay at a high temperature. The ceramic particles may range in size from 3 cm to a dust or powder (approximately 0.5 mm in particle size). While an aggregate comprising ceramic fragments may have any suitable density, in accordance with some embodiments, such an aggregate has an oven-dried bulk density greater than 0.25 gm/cc and less than 2.75 gm/cc, or within any subrange thereof.

In some cases, a reactive aggregate used in a cementitious mixture that cures to form a mortar or a concrete may be derived from only natural deposits, such as the volcanic materials described above. In some cases, a reactive aggregate for use in the cementitious mixture may be derived from only human-made products. In some cases, a reactive aggregate comprises a mixture of natural deposits and human-made products. The mixture of natural deposits and human-made products may be with any proportion suitable for the purpose of the cementitious mixture that cures to form a mortar or concrete.

Activating Material

With respect to the activating material (or the activator), the activating material can comprise any suitable material or combination of materials that are configured to react with the aggregate (e.g., the reactive aggregate) and/or the hydrating solution to cure into a mortar or concrete. In some embodiments, the activator comprises a clinker (e.g., a mixture of calcium oxide with silicone dioxide, aluminum oxide, iron oxide, and/or a variety of other oxides). In some other embodiments, however, the activating material comprises lime and is clinker free (or at least the dry form of the activating material comprises less than 10% clinker, by mass).

The most common type of conventional concrete is Portland Cement Concrete (PCC). The cementitious material in PCC is Portland cement and often includes compounds such as, tricalcium silicate, dicalcium silicate, and tricalcium aluminate, and a tetracalcium aluminoferrite. Portland cement is a fine powder, produced by heating limestone and clay minerals in a kiln to form clinker, grinding the clinker, and adding 2% to 3% of gypsum. Most Portland cement-based concretes and mortars do not have explicit means to develop additional strength after the initial 28-days (or so) of curing time. Typically, Portland cement concretes and mortars experience a continuous reduction in strength and durability over their service lives.

While the production of some clinker phases (used as the basis for some PCC) requires temperatures of about 1450 degrees C., some embodiments of the described systems, methods, and compositions can include lime produced from the calcination of limestone at about 900 degrees C. (thereby producing less $CO_2$ and wasting less fuel than some methods for creating PCC). Additionally, as some embodiments of the activating material in the described systems, methods, and compositions are clinker free, such systems, methods, and compositions do not necessarily require the energy-intensive grinding processes that can be used to fabricate and incorporate the various oxides needed to produce the clinker and to powder the clinker to form the cement component in some PCC. In accordance with some embodiments of the described systems, methods, and compositions, the activating material comprises lime. In this regard, any quicklime (e.g., calcium oxide (CaO) produced by calcining high purity carbonate rock (e.g., rock with about 92 wt % to about 95 wt % calcium oxide)) and/or another composition of lime with a calcium oxide content greater than 40% (e.g., between about 40% and about 92%, or within any subrange thereof), or byproduct derived therefrom, such as hydrated lime, may be used as the activating material. In accordance with some embodiments, lime is also derived from limestone, the limestone used to make lime often contains 80% or more of calcium or magnesium carbonate. Limestone (calcium carbonate) is often calcinated in a lime kiln to produce quicklime (calcium oxide), hydraulic lime, dolomitic lime, and/or magnesium lime. In some cases, the quicklime and/or other lime products can be hydrated with just enough water to produce hydrated lime or calcium hydroxide. Typically, hydrated lime is commercially distributed in a powder form. Unlike some clinkers, the lime component is generally free of silicon dioxide, aluminum dioxide, iron oxide, and/or other oxides, with the exception of calcium oxide.

Where the activating material comprises lime, the activating material can comprise any suitable type of lime, including, without limitation, one or more types of lime, quicklime (e.g., calcium oxide (CaO) produced by calcining high purity carbonate rock (e.g., rock with about 92 wt % to about 95 wt % calcium oxide)), slaked lime powder (e.g., a form of calcium hydroxide that contains molecular water so as to be a dry powder), calcium hydroxide ($Ca(OH)_2$), hydrated lime, lime paste, lime slurry, and/or any suitable type of lime. In some cases, the activating material comprises lime with an initial calcium oxide content of 40 wt % or greater (e.g., between 40 wt % and 100 wt %, or within any subrange thereof). In this regard, while the activator can comprise any suitable amount of calcium oxide and/or calcium hydroxide, in some implementations, the activator includes at least 40 wt % (e.g., between about 42 wt % and about 95 wt %, or within any subrange thereof) calcium oxide and/or calcium hydroxide, when the activator is dry and/or comprises only molecular water. Indeed, in some implementations, the activator includes between about 45 wt % and about 90 wt % calcium oxide when it is dry and encompasses hydraulic lime, dolomitic lime, and/or magnesium lime. In this regard, the activator (e.g. lime) may be combined with reactive aggregate, after hydration of the activator to a paste-like workability, including, without limitation, at a ratio of hydrated activator to reactive aggregate about 1:1.25 to about 1:5.5 by volume (or within any subrange thereof). In some cases, the ratio may be about 1:3. In this regard, the activator (e.g., quicklime) may be combined with reactive aggregate, after hydration of the activator to a consistency where the activator forms lumps of any suitable size, including without, limitation, between about 0.1 mm and about 8 cm, or within any subrange thereof (e.g., 0.1 cm-2 cm in diameter), including, without limitation, at a ratio of hydrated activator to reactive aggregate of about 1:1.25 to about 1:5.5 by volume. In some cases, the ratio may be about 1:3. In some cases, the concentration of calcium oxide in the activator before hydration is about 92 wt % to about 98 wt % calcium oxide (or within any subrange thereof). In some cases, the maximum and minimum ratio between the aggregate and the activating material ranges from 10:1 and 1:1 by volume (or within any subrange thereof) when used to form a cementitious mixture, but may include any suitable range. In some cases, the range is between about 2.5:1 and about 3.5:1 (or any subrange thereof). The activating material may be comprised of any form of lime material and/or one or more products that have a calcium oxide content of 40 wt % or greater before being hydrated. In this regard, the activator can be mixed with any suitable amount of reactive aggregate in the described cementitious mixture, including, without limitation, at a ratio of ambient dry reactive aggregate to dry lime of between about 0.01 and about 10, by mass (or within any subrange thereof).

In accordance with some embodiments, a feature of a lime material as the activating material is that, in combination with reactive aggregates, the cementitious mixture and its resultant cured mortars and/or concretes have the potential to develop strength and cohesive characteristics well beyond the short duration of initial hydration and hardening. In this regard, a cementitious mixture that cures to form a mortar or a concrete made with lime as the activating material and a reactive aggregate can potentially respond to fracture events through self-repair mechanisms, providing additional durability and significantly extending the service life of the concrete.

In this regard, where the aggregate comprises one or more reactive aggregates (as opposed to solely or predominantly comprising inert aggregates, such as conventional inert sand, rock, and/or gravel, as is typically used with PCC), after the initial amount of the activating material (e.g., the hydrated lime) is consumed in initial pozzolanic reactions, additional cementitious phases are produced (in some embodiments) through regenerative post-pozzolanic processes involving the reactive aggregate (and/or reactive filler aggregate) over the lifetime of the material.

In some cases, the activating material may react with the reactive aggregate to form chemical and/or mineralogical bonds beyond the typical binding phase formed during the hydration of a cementitious mixture that cures to form a mortar or a concrete. These chemical and mineralogical bonds increase the strength and durability of the mortar or concrete and in some cases can deter and/or repair microcracks in the mortar or concrete that may form either during the placement process or over time due to weathering, structural settling, seismic ground shaking, water damage, and/or other deleterious conditions.

In accordance with some embodiments, lime in a suitable hydration state as an activating material, as opposed to Portland cement, reduces the propensity for an alkali-silica reaction within the resultant concrete or mortar. In this regard, an alkali-silica reaction is often a deleterious swelling reaction that occurs, given sufficient moisture, over time in PCC between the cement paste, alkaline fluids, and the reactive amorphous silica found in many common aggregates. That said, the mortar and concrete made in accordance with some embodiments of the described systems, methods, and compositions that include lime (e.g., as the activating material) and some reactive aggregates may not be susceptible (or can be significantly less susceptible than PCC) to the alkali-silica reaction. In accordance with some embodiments, reactive aggregates (as described herein) have the potential for beneficial reactive capabilities that deliver aluminum (and other elements) to the binding phase, which can mitigate alkali ingress and/or absorption in the cementing matrix of the mortar or concrete.

In some embodiments, a cementitious mixture undergoes various cementitious processes as it cures and forms a mortar or concrete. In some cases, the principal processes that produce cementing phases occur chronologically as 1) pozzolanic reactions, which may refer to reactions with materials that react with lime in the presence of available moisture to produce durable binding hydrates (commonly the C-A-(K, N, M, F)-S-H binding phase and hydrogarnet, hydrotalcite, and other silicate and/or aluminosilicate hydrate mineral cements), 2) post-pozzolanic reactions, which may refer to reactions that take place after calcium hydroxide has been fully consumed, which produce zeolite minerals, strätlingite, Al-tobermorite, and/or other silicate and/or aluminosilicate mineral cements, 3) reactions that take place through interactions with sulfur bearing species and produce calcium sulfoaluminate and aluminosilicate phases, 4) carbonation reactions that produce carbonate minerals through alteration of previously formed cementing phases and, possibly, unreacted calcium hydroxide (portlandite), and/or 5) unspecified fluid-mortar interactions that produce additional calcite and vaterite in the mortar system.

In some cases, the principal cementing phases that develop in the cementitious mixture as it cures to form a mortar or a concrete are a 1) poorly-crystalline binding phase, calcium-silicate-hydrate (C-S-H), calcium-aluminum-silicate-hydrate (C-A-S-H), and/or any variation of C-(A, K, N, M, F)-S-H with Ca/Si=0.5-2.0 and Ca/(Si+Al)=0.25-2.5, 2) crystalline calcium-silicate-hydrate and/or calcium-aluminum-silicate-hydrate mineral cements, such as tobermorite, Al-tobermorite, jennite, xontilite, strätlingite, hydrogarnets, and/or hydrotalcite, 3) any of the calcium-sulfoaluminate minerals such as ettringite, gypsum, and/or anhydrite, 4) any of the calcium-chloroaluminate minerals, such as hydrocalumite and/or Friedel's salt, 5) any of the large class of zeolite minerals, and/or 6) any of the large class of carbonate minerals, such as calcite, vaterite, and/or aragonite.

Hydrating Solution

With respect to the hydrating solution, the hydrating solution can comprise any suitable aqueous solution or solutions that are configured to hydrate the activating material (e.g., lime) and/or to mix with the reactive aggregate, the activating material, and/or any filler aggregate to form the described cementitious mixtures and their resultant mortars and concretes. Indeed, in some implementations, the hydrating solution comprises water (e.g., freshwater; potable water; deionized water; distilled water; wastewater; reverse osmosis water; filtered water; well water; water from a river, lake, pond, or other body of water; and/or any other suitable type of water).

In some implementations, the hydrating solution acts as a conditioning (or conditioning) solution for the aggregate and/or reactive aggregate (including filler aggregate and/or reactive filler aggregate). In such implementations, the hydrating solution may be applied to the aggregate/reactive aggregate at any suitable time, including, without limitation, prior to mixing the aggregate/reactive aggregate with at least a portion of the activating material, thus conditioning the aggregate/reactive aggregate. In some cases, in which the hydrating solution is used to moisture condition or precondition the aggregate/reactive aggregate, the hydrating solution may be referred to as a conditioning solution. Thus, in some implementations, the hydrating solution (or conditioning solution) acts to moisturize and/or pre-moisturize the aggregate. In other implementations, when the hydrating solution is used to hydrate the activating material, the hydrating solution may have a chemical reaction with the activating solution that causes the activating material to hydrate. In other implementations, the hydrating solution is used as a mixing solution that is used to change the workability (e.g., consistency, viscosity, thickness, flow, and/or other suitable characteristic) of the cementitious mixture.

Where the hydrating solution is used as a conditioning solution, the conditioning solution can comprise any suitable solution, including, without limitation, any of the hydrating solutions, having any of the characteristics, discussed herein. Indeed, in accordance with some implementations, the conditioning solution comprises water and/or any other solution that is suitable to moisturizing the aggregate/reactive aggregate prior to it being combined with at least some of the activating material. In accordance with some implementations, the mixing solution comprises water and/or any other solution that is suitable to changing the workability of the cementitious mixture.

In some cases, the activating material that comprises lime is combined with water and/or any other suitable hydrating solution to hydrate the lime and to provide the activator with a paste or putty-like consistency. In this regard, any suitable amount of hydrating solution can be added to the activator material. Indeed, in some implementations, a ratio of the hydrating solution (e.g., water and/or any other suitable aqueous solution) to the activator (e.g., lime) is between about 0.01:1 and about 10:1 (as mentioned above) or within any subrange thereof (e.g., between about 0.1:1 and about 3.5:1 by mass).

Representative Methods

The described cementitious materials and their resultant mortars and concretes can be made in any suitable manner. Indeed, while one or more portions of the each of the methods described herein and/or shown in the figures can be: omitted, replaced, repeated, performed only partially, performed simultaneously, performed in series, performed so as to overlap with one or more other portions, reordered, and/or otherwise be modified, FIG. 1 illustrates a method for conditioning an aggregate (e.g., one or more reactive aggregates) in accordance with a representative embodiment 100. Not all aggregate is conditioned before it is added to a mortar or a concrete cementitious mixture, therefore this process may be optional in manufacturing concrete. At 110, aggregate (e.g., the reactive aggregate) is combined (in accordance with some embodiments) with any suitable hydrating solution.

Indeed, in some embodiments, the hydrating solution is water (e.g., freshwater). In some other embodiments, the hydrating solution is water with one or more additives.

While such a conditioning can take place in any suitable manner, in some cases, the reactive aggregate is placed in a container (e.g., a sealable container, an open container, a partially sealable container, a mixer, a vacuum container, and/or any other suitable container) and a suitable amount of the hydrating solution (e.g., conditioning solution) is added to the reactive aggregate. In this regard, any suitable amount of hydrating solution can be added to the aggregate. Indeed, in some implementations, a mass of water (and/or any other suitable hydrating solution) to reactive aggregate (and/or any other suitable aggregate material) is at a ratio of between about 0.1:1 and about 5:1, or within any subrange thereof (e.g., 1.25:1 to 3.5:1). More specifically, in some implementations, between about 0.1 parts and about 5 parts hydrating solution (by mass) (or any subrange thereof) are added to 1 part aggregate (e.g., reactive aggregate). Indeed, in some embodiments, there may be excess hydrating solution after the hydrating solution has been mixed with the reactive aggregate. In some implementations, an amount of the hydrating solution that is about twice the measured water absorption capacity of the aggregate (e.g., reactive aggregate) (by mass) may be added to 1 part aggregate (e.g., reactive aggregate).

At 120, the aggregate (e.g., the reactive aggregate) and the hydrating solution are (in accordance with some embodiments) mixed until the aggregate and the hydrating solution are mixed (e.g., evenly distributed). The aggregate and the conditioning solution may be mixed in any suitable manner using any form of mechanical or chemical agitation (e.g., such as, mixing manually using a trowel or shovel or hoe, using a paddle or pug mill, using a rotary mixer, machine mixing, agitating, vibrating, shaking, rotating, rotating drum, tumbler, shaker table and/or any other suitable means for mixing) to help distribute moisture throughout the mixture.

At 130, the mixture of the aggregate (e.g., the reactive aggregate), and the hydrating solution are (in some cases) allowed to rest for any suitable period of time (including, without limitation, between about 1 s and about 180 d, or within any subrange thereof). Indeed, in some cases, the mixture is allowed to rest for between about 4 h and about 2 d (e.g., between about 3.5 h and about 48 h). In some cases, the container with the mixture of the aggregate and the hydrating solution is sealed while the mixture rests.

In some implementations, the hydrating solution acts as a moisture conditioning (or pre-conditioning) solution for the aggregate and/or reactive aggregate (including filler aggregate and/or reactive filler aggregate). In such implementations, the hydrating solution (or conditioning solution) may be applied to the aggregate/reactive aggregate at any suitable time, including, without limitation, prior to mixing the aggregate/reactive aggregate with at least a portion of the activating material, thus pre-moisture conditioning the aggregate/reactive aggregate. Thus, in some implementations, the hydrating solution (or conditioning solution) acts to condition, moisturize, and/or pre-moisturize the aggregate. In other implementations, when the hydrating solution is used with the activating material, the hydrating solution may have a chemical reaction with the activating material that causes the activating material to hydrate. In other implementations, the hydrating solution is used as a mixing solution, used to change the workability of the cementitious mixture.

Where the hydrating solution is used as a conditioning solution, the conditioning solution can comprise any suitable solution, including, without limitation, any of the hydrating solutions, having any of the characteristics, discussed herein. Indeed, in accordance with some implementations, the conditioning solution comprises water and/or any other solution that is suitable to moisturizing the aggregate/reactive aggregate prior to it being combined with at least some of the activating material. In accordance with some implementations, the mixing solution comprises water and/or any other solution that is suitable to changing the workability of the cementitious mixture.

Figure 2:
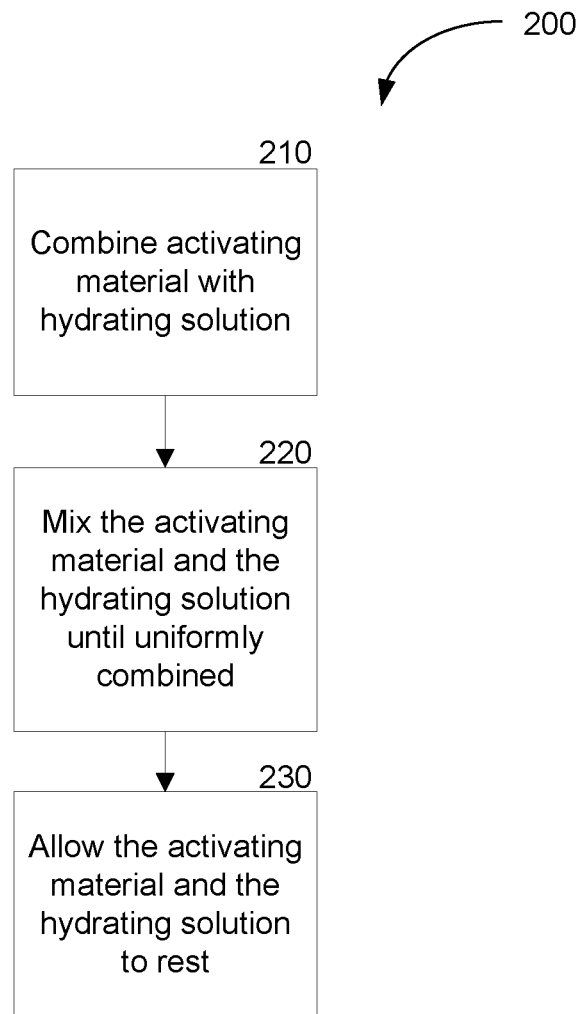
FIG. 2 illustrates a method for hydrating a lime activator in accordance with a representative embodiment.

FIG. 2 illustrates a method for hydrating a lime activator in accordance with a representative embodiment 200. In this regard, the activating material is not always hydrated (e.g., dry or un-hydrated) before it is added to the cementitious mixture, therefore this process may (in accordance with some embodiments) be omitted. In some other instances, however, the activating material is obtained in a hydrated form. Indeed, in an alternative embodiment, the activating material, and the aggregate (e.g., the reactive aggregate) are combined prior to the addition of the hydrating solution (e.g., the first hydrating solution). Alternatively, in yet another embodiment, the activating material, the aggregate (e.g., the reactive aggregate), and/or the hydrating solution are combined in a single step. At 210, the activating material, that comprises lime, is (in accordance with some embodiments) combined with the hydrating solution. The activating material may be lime, and/or any other material with pozzolanic activation properties (as described above). In some embodiments, however, the activating material comprises lime. The hydrating solution (e.g., the second hydrating solution) may be freshwater and/or any other suitable material for hydrating an activating material. Indeed, in some embodiments, a ratio of the hydrating solution (e.g., water and/or any other suitable aqueous solution) to the activating material (e.g., lime) is between about 0.01:1 and about 10:1 by mass or within any subrange thereof (e.g., between about 0.1:1 and about 3.5:1 by mass).

At 220, the cementitious material and the hydrating solution are (in accordance with some embodiments) mixed until they are substantially uniformly combined. In this regard, the cementitious material and the hydrating solution may be mixed in any suitable manner using any form of mechanical or chemical agitation (e.g., such as, manually using a trowel or shovel or hoe, using a paddle mill, using a rotary mixer, machine mixing, agitating, vibrating, shaking, rotating, rotating drum, tumbler, pug mill, and/or any other suitable means for mixing).

At 230, the mixture of the activating material and the hydrating solution are (in accordance with some embodiments) allowed to rest for any suitable period of time (including, without limitation, between about 1 s and about 180 d, or within any subrange thereof). Indeed, in some cases, the mixture is allowed to rest for between about 4 h and about 2 d (e.g., between about 3.5 h and about 48 h). In some cases, the container with the mixture of the activating material and the hydrating solution is sealed while the mixture rests.

Figure 3:
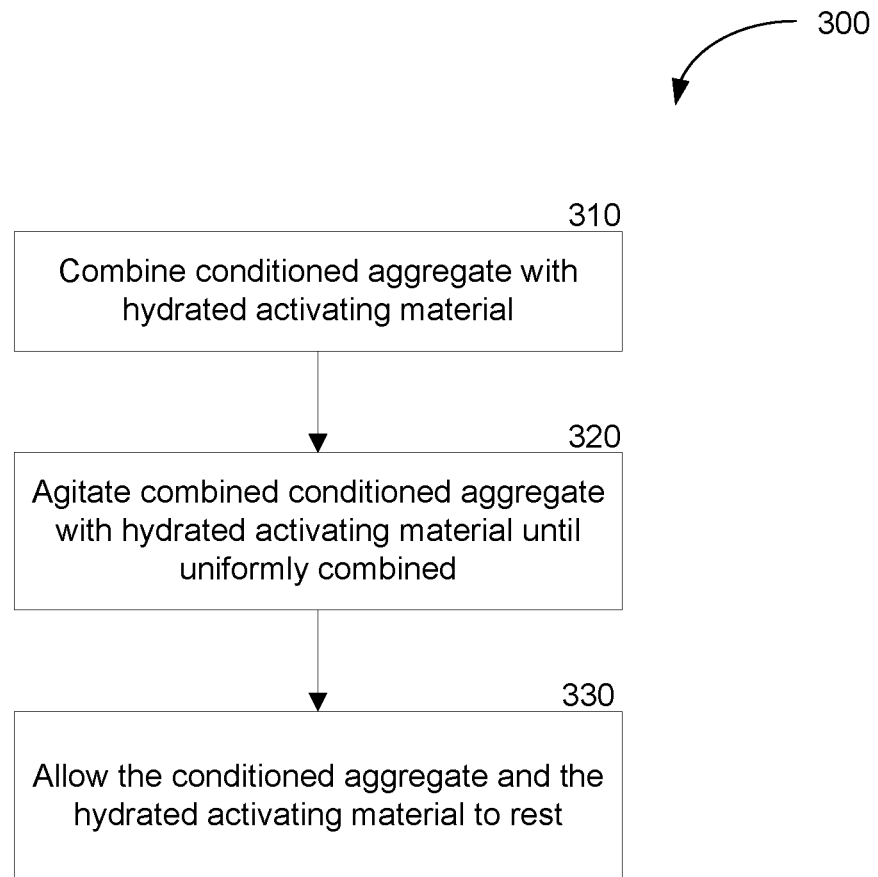
FIG. 3 illustrates a method for making a mortar or concrete according to a representative embodiment.

FIG. 3 illustrates a method for making a mortar or concrete according to a representative embodiment 300. As in the other methods described herein, one or more portions of the described method can be omitted, replaced, repeated, be performed only partially, be performed simultaneously, be performed in series, be performed so as to overlap with one or more other portions, be reordered, and/or otherwise be modified. In this embodiment, the aggregate (e.g., the reactive aggregate) is conditioned and the activating material is hydrated prior to being combined to make a mortar or concrete. At 310, the conditioned aggregate and the hydrated activating material are combined. In this regard, the conditioned aggregate and the hydrated activating material can be mixed together at any suitable ratio. Indeed, in some embodiments, a ratio of the conditioned reactive aggregate and the activator (e.g., lime) and the hydrating solution is between about 0.5:1 and about 10:1, or within any subrange thereof (e.g., 1.5:1 and about 5:1), by volume. At 320, the combined conditioned aggregate and hydrated activating material are (in accordance with some embodiments) agitated until substantially uniformly combined. The mixture is substantially uniformly combined when the aggregate (e.g., the reactive aggregate) is evenly distributed among the hydrated activating material. In this regard, the conditioned aggregate and the hydrated activating material can be mixed in any suitable manner, using any form of mechanical or chemical agitation (e.g., such as, manually using a trowel or shovel or hoe, using a paddle mill, using a rotary mixer, machine mixing, agitating, vibrating, shaking, rotating, rotating drum, and/or any other suitable means for mixing).

At 330, the mixture of the conditioned aggregate and the hydrated activating material are (in accordance with some embodiments) allowed to rest for any suitable period of time (including, without limitation, between about 1 s and about 180 d, or within any subrange thereof). Indeed, in some cases, the mixture is allowed to rest for between about 3 h and about 2 d (e.g., between about 3.5 h and about 48 h). In some cases, the container with the mixture of the conditioned aggregate and the hydrated activating material is sealed while the mixture rests.

Figure 4:
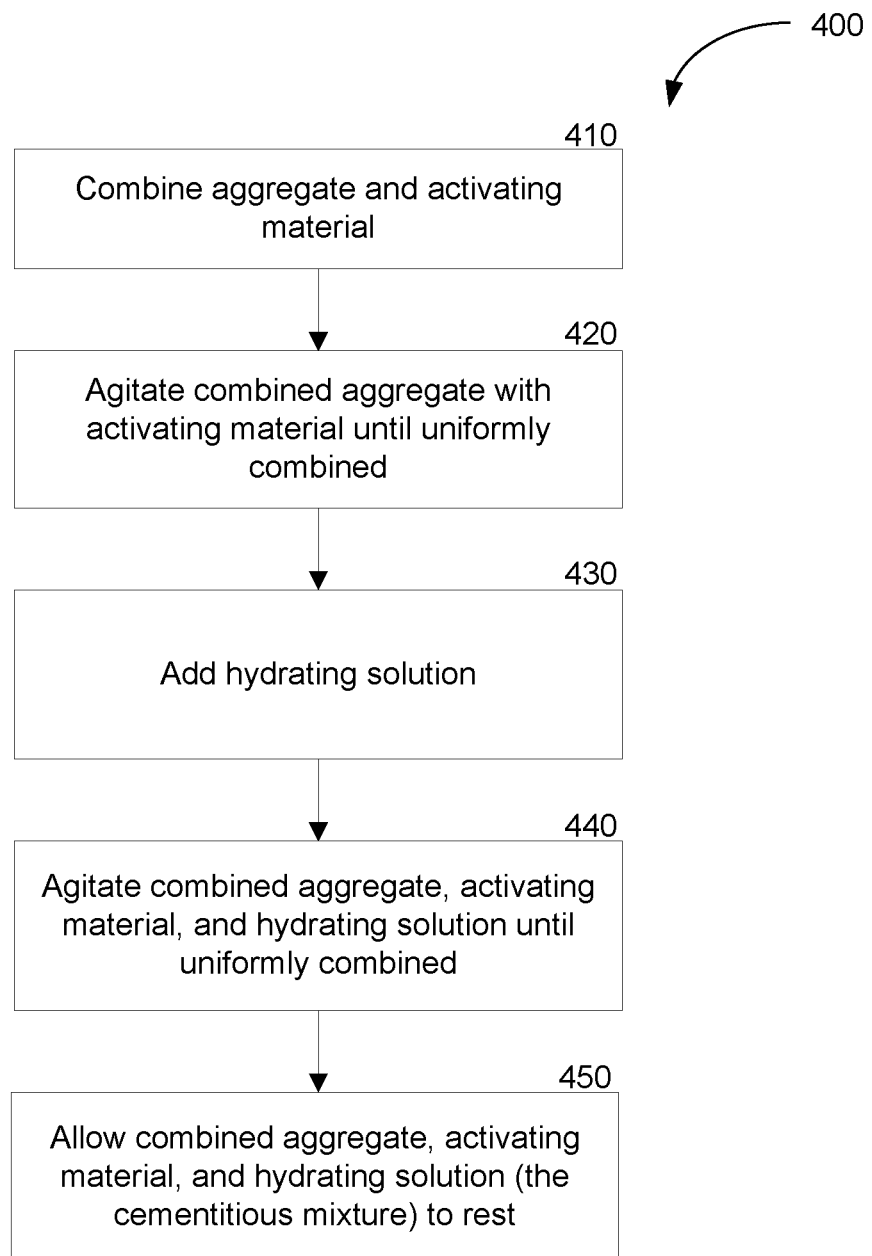
FIG. 4 illustrates a method for making a mortar or concrete according to a representative embodiment.

FIG. 4 illustrates a method for making a mortar or concrete according to a representative embodiment 400. In this embodiment, the aggregate (e.g., the reactive aggregate) is not conditioned and the activating material is not hydrated prior to mixing. At 410, the aggregate (e.g., the reactive aggregate) and the activating material are combined. In this regard, the aggregate and the hydrated activating material can be mixed together at any suitable ratio. Indeed, in some embodiments, a ratio of the reactive aggregate and the activator (e.g., lime) and the hydrating solution (e.g., the hydrated lime paste) is between about 0.5:1 and about 10:1, or within any subrange thereof (e.g., 1.5:1 and about 5:1) by volume. At 420, the mixture of the aggregate and activating material are agitated until they are substantially uniformly combined. At this stage, instead of mixing the aggregate and the activating material, the activating material may be allowed to coat the aggregate (e.g., the reactive aggregate) such that the outer surface of the aggregate may be covered in activating material. That said, where the aggregate and the activating material are mixed, they may be mixed in any suitable manner using any form of mechanical or chemical agitation (e.g., such as, mixing using a paddle mill, pug mill, trowel, or shovel, rotary mixer, machine mixing, agitating, vibrating, shaking, rotating, rotating drum, hoe, and/or any other suitable means for mixing).

At 430, a hydrating solution is added to the mixture of the aggregate (e.g., the reactive aggregate) and the activating material. In some embodiments, the hydrating solution comprises freshwater. According to some embodiments, the proportion of the hydrating solution to the activating material by mass is between 0.01:1 and 3.5:1 inclusive, or within any subrange thereof.

At 440, the mixture of the aggregate (e.g., the reactive aggregate), the activating material, and the hydrating solution are agitated until they are substantially uniformly combined. In this regard, the mixture may be mixed in any suitable manner using any form of mechanical or chemical agitation (e.g., such as, manually using a trowel or shovel or hoe, using a paddle mill, using a rotary mixer, machine mixing, agitating, vibrating, shaking, rotating, rotating drum, and/or any other suitable means for mixing).

At 450, the mixture of the aggregate (e.g., the reactive aggregate), the activating material, and the hydrating solution are (in accordance with some embodiments) allowed to rest for any suitable period of time (including, without limitation, between about 1 s and about 180 d, or within any subrange thereof). Indeed, in some cases, the mixture is allowed to rest for between about 3 h and about 2 d, or within any subrange thereof (e.g., between about 3.5 h and about 48 h). In some cases, the container with the cementitious mixture is sealed while the cementitious mixture rests.

Figure 5:
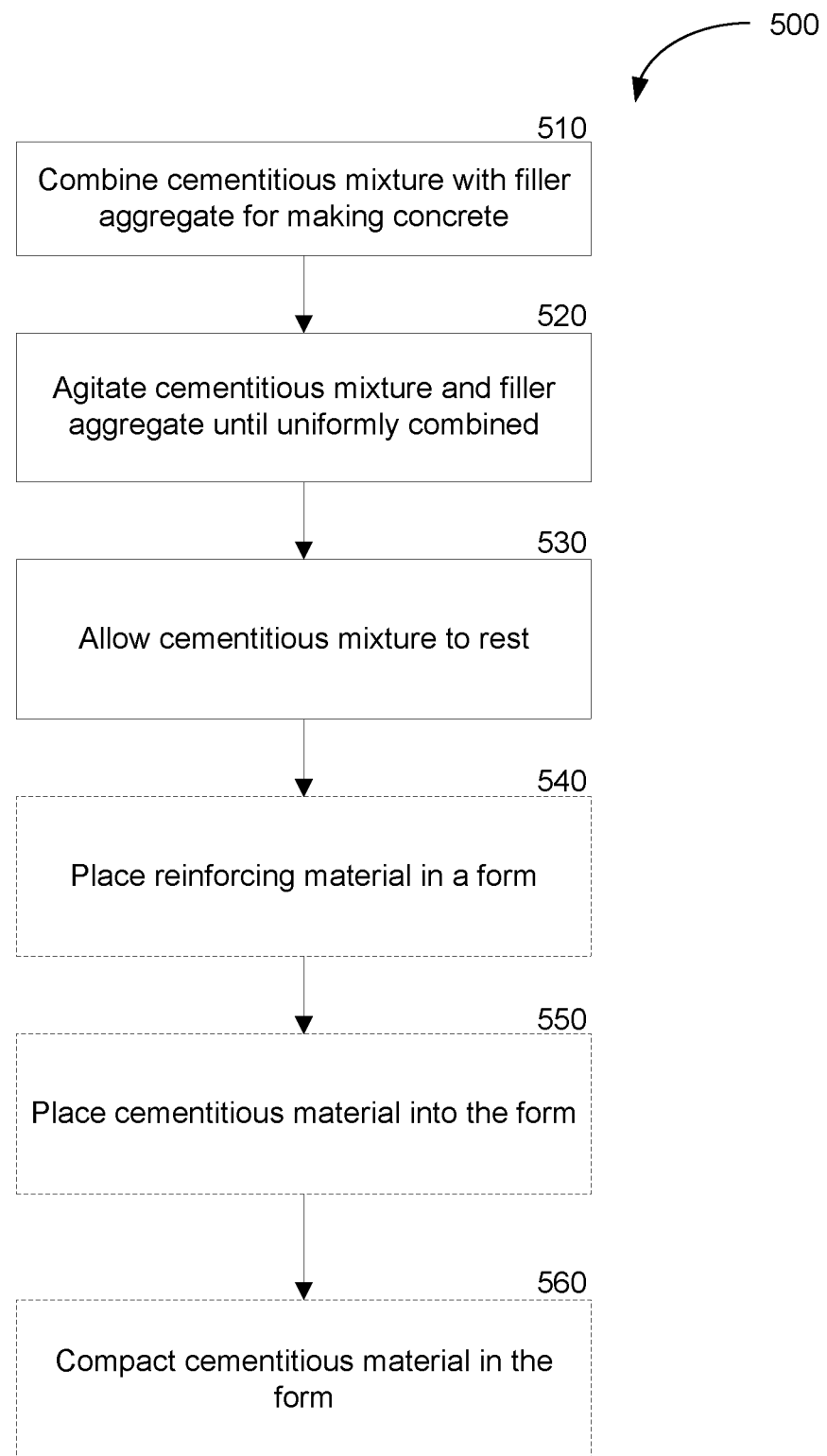
FIG. 5 illustrates a method for making a concrete from a cementitious mixture in accordance with a representative embodiment.

FIG. 5 illustrates a method for making a concrete from a cementitious mixture in accordance with a representative embodiment 500. The cementitious mixture can be made by the methods shown in FIG. 3, FIG. 4, or any other suitable method for making a cementitious mixture. At 510, FIG. 5 shows that in accordance with some embodiments, the cementitious mixture is combined with a filler aggregate (e.g., reactive filler aggregate) to ultimately form concrete. In this regard, the filler aggregate can be added to the cementitious mixture in any suitable manner (e.g., manually, via mixing, via a hopper, via a conveyor, and/or in any other suitable manner) and at any suitable time (e.g., before mixing, during mixing, during placement, and/or at any other suitable time). Indeed, in some embodiments where the filler aggregate is smaller than about 32 mm, the filler aggregate is added directly into, and mixed with, the cementitious mixture. In some embodiments in which the filler aggregate is larger than about 32 mm, the filler aggregate is added to the cementitious mixture in any other suitable manner, including, without limitation, manually and/or via conveyor. Again, in some embodiments, the filler aggregate (e.g., the reactive filler aggregate) does not exceed 80%, by volume, of the final cementitious mixture.

At 520, the mixture of the cementitious mixture and filler aggregate (e.g., the reactive filler aggregate) are agitated until they are substantially uniformly combined. In accordance with some embodiments, the mortar and filler aggregate are substantially uniformly combined when the mortar is evenly distributed around the filler aggregate. The mixture may be mixed in any suitable manner using any form of mechanical or chemical agitation (e.g., such as, manually using a trowel or shovel or hoe, using a paddle mill, using a rotary mixer, machine mixing, agitating, vibrating, shaking, rotating, rotating drum, and/or any other suitable means for mixing).

At 530, the combined cementitious material and filler aggregate (e.g., the reactive filler aggregate) are allowed to rest for any suitable period of time (including, without limitation, between about 1 s and about 180 d, or within any subrange thereof). Indeed, in some cases, the mixture is allowed to rest for between about 4 h and about 2 d (e.g., between about 3.5 h and about 48 h). In some cases, the container with the cementitious mixture is sealed while the cementitious mixture rests. During the rest period the mixture may be periodically agitated to prevent the mixture from curing prior to being placed in a form. Once the cementitious mixture has been created, it can be dumped, carried, molded, cast, manually transported, conveyed, pumped, and/or otherwise be installed in any suitable location and allowed to cure.

At 540, one or more reinforcing materials may be placed in a formwork structure for concrete. Adding reinforcing material to the concrete is optional. In some embodiments, the reinforcing material may be one or more non-metallic reinforcements, glass fiber reinforcements, extruded basalt fibers, types of basaltic particles, glass derived from basalt, crystalline particles (such as zeolites), synthetic fibers (such as para-aramid), natural fibers (such as cellulose), natural plant fibers, and/or any other suitable material.

At 550, the cementitious material may be placed in a formwork structure for concrete. Placing the concrete in a form is optional, since not all cementitious material is placed in a form to cure. At 560, the cementitious material is compacted within the formwork structure. Compacting the cementitious material in the formwork structure is optional, not all cementitious material is compacted once placed.

Figure 6:
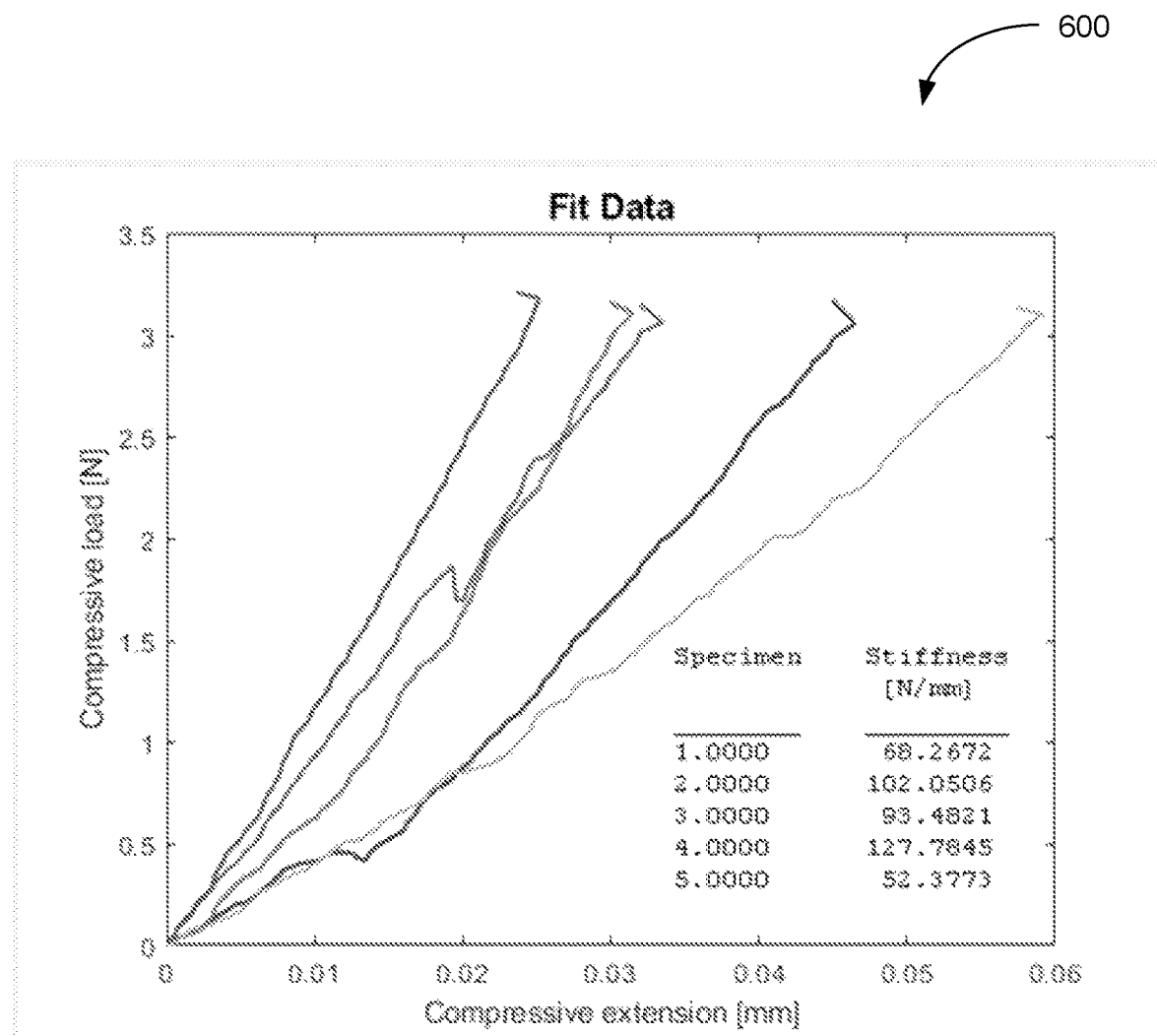
FIG. 6 illustrates a displacement of a cured cementitious mixture versus an applied compressive load in accordance with a representative embodiment.

FIG. 6 illustrates the displacement of the cementitious mixture versus an applied compressive load 600. According to a representative embodiment, the reactive aggregate, the activating material comprised of lime, and a freshwater hydrating solution were combined to form a cementitious material that was allowed to cure to form a mortar. A graph of a compressive load versus compressive extension test results are depicted in FIG. 6. The test was performed with a 1-inch steel indenter attached to a mechanical load frame to measure indentation force and displacement for computation of mechanical stiffness gain. The test results showing that the material has increased in mechanical stiffness.

In addition to the aforementioned features, some embodiments of the described systems, methods, and compositions may include one or more additional features. For instance, in accordance with some embodiments, the described mortars and concretes can self-repair in any suitable manner, including, without limitation, at a microstructural level. Indeed, in some cases, one or more microstructural cementing components include 1) a cementing matrix that is composed of somewhat contiguous poorly-crystalline binding phase at the micrometer-scale with a range of C-A-(K, N, M, F)-S-H compositions that surrounds the reacted relicts of fine aggregate particles (<0.5 mm), 2) toughened interfacial zones that may have mineral cements, such as hydrogarnet, strätlingite, and/or Al-tobermorite, that protrude from the surfaces of aggregate particles ≥0.5 mm into the cementing matrix, and 3) aggregate particles with pores (or vesicles) that connect to the cementing matrix and are, themselves, partially filled with pozzolanic and post-pozzolanic cementing phases.

In accordance with some embodiments, the cementitious materials described demonstrate that reactions of components of the reactive aggregate with fluids in the concrete masonry structures produce new mineral cements after calcium hydroxide is fully consumed. Thus, in some cases, when microcracks form in the cementitious material, these post-pozzolanic processes produce new mineral cements than can fill crack surfaces and/or the linkages between microcrack surfaces. In some cases, calcite also fills microcrack surfaces; it may crystallize from fluids derived from surface, ground and flood waters that dissolve components of the mortar as they travel through the concrete structure.

Additionally, in accordance with some embodiments, the described systems, methods, and compositions allow for one or more mechanisms to help resist the formation of structural scale discontinuities, namely through: (1) the use of larger reactive aggregate can significantly increase the length of the path, and thus total energy of propagation required, for a through-going fracture to propagate, (2) the use of reactive aggregates that beneficially react with fluids within the cementitious material to produce mineral cements at interfacial transition zones, significantly toughening what is the often the weakest region in conventional PCC materials, and/or (3) the cementing microstructures that produce obstacles to microfracture propagation. In some cases, microfracture nucleation is the mechanically stress-induced increase in size of an initially small flaw in the material, until it reaches a structurally significant length scale. For some slowly nucleating microfractures, the regenerative self-repair processes outlined above may potentially retard or even prevent this progressive increase in fracture size.

Some features of the concretes prepared as described above are that they can be significantly longer lasting than some traditional PCC. In this regard, some embodiments of the described cementitious materials are longer lasting because they are resistant to the formation of structural-scale discontinuities that lead to the breakdown of PCC structures. This can result in lower economic and environmental costs. Additionally, in accordance with some embodiments, these cementitious materials exhibit the ability to regeneratively self-repair at the micrometer scale. In some cases, the cementitious materials described herein can also reduce or eliminate the need for reinforcing steel because of their higher ductility, or fracture toughness. Other benefits include less embodied energy to manufacture, especially without steel reinforcement and less vulnerability to deleterious production of alkali-silica gels and other forms of decay.

The described systems, methods, and compositions may be embodied in other specific forms without departing from its spirit or essential characteristics. The described embodiments, examples, and illustrations are to be considered in all respects only as illustrative and not restrictive. The scope of the described systems, methods, and compositions is, therefore, indicated by the appended claims rather than by the foregoing description. Each of the various elements of the described embodiments, embodiments, figures, and examples can be mixed and matched with each other in any suitable manner. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object-regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A cementitious mixture comprising:
   a reactive aggregate, comprising:
      an oven-dried bulk density between about 0.25 gm/cc and about 3.5 gm/cc,
      a porous structure, and
      at least 5% of a total mass of the reactive aggregate comprising particles that are less than 1 mm in size;
   a hydrating solution comprising water;
   an activating material comprising at least 40% calcium oxide by mass, and
   a reactive filler that causes the cementitious mixture to cure as a concrete.

2. The cementitious mixture of claim 1, wherein the reactive aggregate comprises at least one of:
   an engineered cellular magmatic material, a foam glass product, a ceramic material, brick fragments, fired brick fragments, a natural volcanic pumice, a synthetic pumice, a volcanic tephra, a volcanic scoria, a volcanic tuff, a lava, a volcanic glass, natural volcanic rock particles, a pyroclastic deposit material, vitric volcanic fragments, lithic volcanic fragments, crystalline volcanic fragments, lapilli fragments, zeolites, and a carbonate rock.

3. The cementitious mixture of claim 1, wherein the reactive aggregate comprises a material obtained from a geologic deposit and comprises an oven-dried bulk density between about 0.5 and 3.0 grams per cubic centimeter.

4. The cementitious mixture of claim 1, wherein the reactive aggregate comprises ceramic fragments having an oven-dried bulk density between about 1.5 gm/cc and about 3.0 gm/cc.

5. The cementitious mixture of claim 1, wherein the reactive aggregate comprises a foam glass product having an oven dried bulk density between about 0.25 gm/cc and about 3.0 gm/cc.

6. The cementitious mixture of claim 1, wherein a ratio of the hydrating solution to the activating material is between about 0.01:1 and about 3.5:1 by mass.

7. The cementitious mixture of claim 1, wherein the activating material and the reactive aggregate are combined such that a ratio between the activating material and the reactive aggregate is between 0.01 to 10, by mass.

8. The cementitious mixture of claim 1, wherein the reactive filler has a particle size greater than 0.5 mm.

9. The cementitious mixture of claim 1, wherein the reactive filler comprises an engineered cellular magmatic aggregate.

10. The cementitious mixture of claim 1, wherein the reactive filler comprises less than 80% of a volume of the cementitious mixture.

11. A method for producing a cementitious mixture, the method comprising:
- obtaining a reactive aggregate comprising: an oven-dried bulk density between about 0.25 gm/cc and about 3.5 gm/cc; a porous structure; and at least 5% of a total mass of the reactive aggregate comprising particles that are less than 1 mm in size;
- obtaining a hydrating solution comprising water;
- obtaining an activating material comprising at least 40% calcium oxide by mass;
- obtaining a reactive filler that causes the cementitious mixture to cure as a concrete; and
- combining the reactive aggregate, the activating material, the reactive filler, and the hydrating solution together to form the cementitious mixture.

12. The method of claim 11, wherein the reactive aggregate comprises an engineered cellular magmatic aggregate comprising an oven-dried bulk density between about 0.25 gm/cc and about 2.75 gm/cc.

13. The method of claim 11, wherein the reactive aggregate comprises a pozzolanic material obtained from a geologic deposit, and wherein the reactive aggregate comprises an oven-dried bulk density between about 0.5 gm/cc and about 3.0 gm/cc.

14. The method of claim 11, wherein the reactive aggregate comprises ceramic fragments having an oven-dried bulk density between about 1.5 gm/cc and about 3.0 gm/cc.

15. The method of claim 11, wherein the reactive aggregate comprises a foam glass product having an oven-dried bulk density between about 0.25 gm/cc and about 2.75 gm/cc.

16. The method of claim 11, further comprising:
- proportioning the hydrating solution to the activating material at a ratio between about 1.25:1 and about 3.5:1 by mass.

17. The method of claim 11, further comprising:
- combining the reactive aggregate with the hydrating solution; and
- agitating the reactive aggregate and the hydrating solution until the reactive aggregate and the hydrating solution are evenly distributed.

18. A cementitious mixture comprising:
- a reactive aggregate comprising at least one of an engineered cellular magmatic aggregate, a ceramic aggregate, a foam glass product aggregate, a brick or fired brick aggregate, and a synthetic pumice aggregate, having:
  - an oven-dried bulk density between about 0.25 gm/cc and about 3.5 gm/cc,
  - a porous structure having a connected porosity that accounts for between 5% and 50% of the reactive aggregate by volume, and
  - at least 5% of a total mass of the reactive aggregate comprising particles that are less than 1 mm in size; and
- a hydrated activating material,
- wherein the reactive aggregate is present in the cementitious mixture at a ratio between the hydrated activating material and the reactive aggregate is between 0.01 and 10 inclusive, by mass.

19. The cementitious mixture of claim 18, wherein the reactive aggregate comprises the engineered cellular magmatic aggregate.

20. The cementitious mixture of claim 18, further comprising:
- a hydrating solution.

\* \* \* \* \*